United States Patent
Takaoka et al.

(10) Patent No.: US 6,350,828 B1
(45) Date of Patent: Feb. 26, 2002

(54) POLYPROPYLENE RESIN COMPOSITION AND USE THEREOF

(75) Inventors: Tohru Takaoka; Ikunori Sakai, both of Sakai; Hideki Nakagawa, Osakasayama; Mikio Hashimoto, Sakai; Satoshi Matsuura, Ichihara; Takashi Shimizu, Takaishi, all of (JP)

(73) Assignee: Grand Polymer Co Ltd, Tokyo (JP)

( * ) Notice: Subject to any disclaimer, the term of this patent is extended or adjusted under 35 U.S.C. 154(b) by 0 days.

(21) Appl. No.: 09/269,640

(22) PCT Filed: Aug. 4, 1998

(86) PCT No.: PCT/JP98/03470

§ 371 Date: Mar. 31, 1999

§ 102(e) Date: Mar. 31, 1999

(87) PCT Pub. No.: WO99/07752

PCT Pub. Date: Feb. 18, 1999

(30) Foreign Application Priority Data

Aug. 5, 1997 (JP) .............................................. 9-210385

(51) Int. Cl.$^7$ .................................................. C08F 4/52
(52) U.S. Cl. .................... 526/125.3; 526/351; 526/128; 526/65; 525/53; 525/240
(58) Field of Search .............................. 526/351, 125.3, 526/128, 65; 525/53, 240

(56) References Cited

FOREIGN PATENT DOCUMENTS

| EP | 0280297 | 8/1988 |
|---|---|---|
| EP | 0708146 | 4/1996 |
| EP | 0736552 | 10/1996 |
| EP | 0775714 | 5/1997 |
| JP | 04202507 | 7/1992 |
| JP | 06 93034 | 4/1994 |
| JP | 08120157 | 5/1996 |
| JP | 09263606 | 10/1997 |

*Primary Examiner*—David W. Wu
*Assistant Examiner*—William K Cheung

(57) ABSTRACT

A polypropylene resin composition exibiting a high melt tension and superior moldability, which can be molded efficiently by a high-speed molding into scarcely deformable larger molded articles of better appearance with high stiffness and which comprises polypropylene as a main component and has the following characteristic features 1) to 4), namely, 1) that a melt flow rate (MFR, determined at 230° C. under a load of 2.16 kg) is in the range of 0.01 to 5 g/10 min.,
2) that a content of a high molecular weight polypropylene exhibiting an intrinsic viscosity [η], determined at 135° C. in decalin, of 8–13 dl/g is in the range of 15 to 50% by weight,
3) that a gel areal density in number is 3,000/450 cm$^2$ or less and
4) that a molecular weight distribution determined by gel permeation chromatography (GPC) is 6–20, as expressed by Mw/Mn, and is 3.5 or higher, as expressed by Mz/Mw.

18 Claims, No Drawings

POLYPROPYLENE RESIN COMPOSITION AND USE THEREOF

FIELD OF THE TECHNIQUE

The present invention relates to a polypropylene resin composition, to a process for the production of such resin composition and to uses thereof.

BACKGROUND OF THE TECHNIQUE

Polypropylene has widely been used in various fields including automobile parts, machine and electric appliances, household commodities, kitchen utensils and packaging films. However, problems have been brought about in that large-sized formed articles are difficult to obtain by, for example, extrusion molding, and in that a high speed molding can scarcely be attained, since polypropylene exhibits lower melt tension (abbreviated hereinafter sometimes as MT). Concretely, the following problems have been encountered:

(1) In blow molding, a phenomenon of "draw-down" due to stretching of the parison by its own weight, causing decrease in the film thickness may be apt to occur, whereby blow molding of large-sized articles, for example, automobile parts, such as bumper and spoiler; and others, such as bottles, is rendered difficult.

(2) In the case of production of sheet or film by a calendering technique, the resulting sheet or film may often suffer from thickness irregularity and, in addition, it has a lower surface gloss.

(3) In the case of production of formed articles by extrusion molding, a high-speed molding may scarcely be practised and, in addition, large-sized extrusion-molded articles may difficultly be obtained.

(4) In the case of production of vacuum- or pressure formings from a sheet by a vacuum or pressure forming technique, large-sized molded articles are difficult to obtain and, in addition, a deep drawing may difficultly be incorporated.

(5) In the case of production of sheet or film by an inflation molding technique, a poor surface condition may often be encountered, since the baloon may often become unstable.

(6) In the case of producing stretched films, the resulting film may be apt to suffer from occurrence of so-called surging, so that an accident of film breaking upon the stretching may occur and, in addition, the resulting stretched film exhibits a low thickness accuracy.

(7) In the case of producing foamed articles, foaming with a high foaming ratio may difficultly be attained and, in addition, the cells of foamed article are large and coarse with non-uniform cell size.

In order to avoid these problems, it has heretofore been practised to employ such polypropylene reins as given below in which the melt tension is increased:

1) A polypropylene resin composition prepared by blending a polypropylene with a high-pressure low-density polyethylene or with a high-density polyethylene 2) A polypropylene resin having a widely extended molecular weight distribution 3) A modified polypropylene resin which is obtained by slightly cross-linking a polypropylene resin using a peroxide, electron irradiation or maleic acid 4) A branched long chain polypropylene resin which is obtained by introducing long chain branching upon the polymerization of propylene.

However, these prior art polypropylene resins having improved melt tension exhibit disadvantages in that the formed article produced therefrom reveals inferior appearance and/or lower transparency and in that the stiffness of the resin is insufficient, though occurence of draw-down is made scarce for all these resins. Alternatively, if the molding temperature is elevated in order to effect a high speed molding, problems may be brought about that the resin will suffer from deterioration due to increased heat evolution in the resin, causing higher trend to gel formation (fish eye formation).

In Japanese Patent Kokai Sho-59-149907 A, there is disclosed a process for producing a polypropylene resin having higher melt tension and higher stiffness with superior moldability by a two-stage polymerization. This process comprises performing a 1st stage polymerization of propylene to build up 50–85%, based on the entire weight of the final polymer product, of a polypropylene product having an intrinsic viscosity [η] of 0.5–3.0 dl/g and, then, effecting a 2nd stage polymerization to build up 50–15%, based on the entire weight of the final polymer product, of a polypropylene product having an intrinsic viscosity [η] of at least 9 dl/g, to thereby produce a crystalline polypropylene resin composition having, as the entire polypropylene resin composition, an intrinsic viscosity [η] of 2–6 dl/g, a melt flow rate (MFR) of 0.01–5 g/10 min. and an isotactic pentad fraction of 0.940 or higher.

The polypropylene resin composition produced by this process exhibits, however, a wide molecular weight distribution, as seen, for example, from the Mw/Mn values given in Examples of the specification of this prior patent gazette in the range of 23.2–42.2, so that the moldability of this resin composition is worse, whereby the appearance of the molded articles therefrom becomes inferior. In addition, it exhibits a lower isotactic pentad fraction, as seen in Examples of the patent gazette in the range of 0.955–0.969, so that the stiffness of the resin is insufficient. Moreover, the polypropylene resin composition obtained by the above-mentioned two-stage polymerization suffers from a problem of high tendency to occurrence of gel formation which causes deterioration in the appearance of the molded article, since a polypropylene product exhibiting a low intrinsic viscosity [η] is produced in the first stage polymerization and a polypropylene product exhibiting a high intrinsic viscosity [η] is produced in the second stage polymerization. Furthermore, when performing the above-mentioned two-stage polymerization in a continuous way for the benefit of industrial production in order to produce a polypropylene product having a low intrinsic viscosity [η] in the first stage polymerization and to produce a polypropylene product having a high intrinsic viscosity [η] in the second stage polymerization, it is necessary to effect the first stage polymerization of propylene in the presence of hydrogen and to realize the second stage polymerization of propylene in the absence of hydrogen, so that it is required to reduce the excess hydrogen contained in the reaction product from the first stage polymerization as low as possible on subjecting it to the second stage polymerization and, thus, a complicated polymerization apparatus becomes necessary. There may occur a still further problem in that a sufficiently high intrinsic viscosity [η] of the polypropylene product resulting from the second stage polymerization is not obtained due to the presence of the unremoved hydrogen rest, which may bring about an insufficient melt tension and insufficient stiffness.

In Japanese Patent Kokai Sho-59-172507 A, a process for producing a polypropylene resin superior in the stiffness, moldability and heat resistance by polymerizing propylene in two stages is disclosed. This process comprises producing, in one stage, 35–65%, based on the total weight of the final resin, of a polypropylene product having an intrinsic viscosity [η] of 1.8–10 dl/g and an isotacticity of at least 97.5% by weight and producing, in the other stage, 65–35%, based on the total weight of the final resin, of a polypropylene product having an intrinsic viscosity [η] of 0.6–1.2 dl/g and an isotacticity of at least 96.5% by weight, so as to thereby obtain a polypropylene resin composition having, as a whole, an intrinsic viscosity [η] of 1.2–7 dl/g and a molecular weight distribution expressed by Mw/Mn of 6–20. However, the intrinsic viscosity [η] of the polypropylene product of higher intrinsic viscosity [η] side, namely, higher molecular weight side, of the polypropylene resin composition is relatively low, as seen from the values given in Examples of the above patent gazette lying in the range of 2.10–7.28 dl/g, so that a sufficient melt tension and sufficient stiffness will not be attained, resulting thereby sometimes in an inferior appearance and insufficient strength of the molded article produced therefrom.

In Japanese Patent Kokai Hei-6-93034 A (corresponding to EP 573862 A2), a crystalline polypropylene resin is disclosed, which has an MIL value of >2 g/10 min., an intrinsic viscosity [η] of ≦2.8 dl/g, an Mw/Mn value of >20 and a 25° C. xylene-insoluble matter of ≧94 and contains a fraction which has an intrinsic viscosity [η] of ≧2.6 dl/g of 10–60% by weight. It is taught that this polypropylene resin can be produced by a successive polymerization comprising at least two steps and is superior in the processibility in molten state. The polypropylene resin composition described in the above patent gazette has a defect that the appearance of the extrusion-molded or blow-molded article thereof is inferior due to its lower moldability, though it develops a high melt tension, since it has an Mw/Mn value exceeding 20.

In Japanese Patent Kokai Sho-58-7439, a polypropylene resin composition is disclosed, which is composed of 30–70% by weight of a crystalline polypropylene having an intrinsic viscosity [η] of 0.6–3.5 dl/g and 70–30% by weight of a crystalline polypropylene having an intrinsic viscosity [η] of at least 2.5 times that of the former within the range of 5–10 dl/g and which has, as a whole, an intrinsic viscosity [η] of 4–6 dl/g. It is taught that this polypropylene resin composition exhibits a superior moldability while maintaining superior mechanical properties intrinsic to crystalline polypropylene, such as stiffness, shock resistance etc., and superior physical properties, such as transparency and heat resistance, in addition to an advantageous feature of elimination of troublesome occurrence of gel formation, so that it is adapted to a hollow molding and extrusion molding. However, this polypropylene resin composition suffers from a problem that intricated process steps are required due to the necessity of melt-blending two polypropylene resins having intrinsic viscosities [η] markedly different from each other, in addition to the circumstances that the molded articles produced from this polypropylene resin composition is subject to occurrence of gel formation, resulting in an inferior appearance.

An object of the present invention is to provide a polypropylene resin composition exibiting a high melt tension and superior moldability, which can be molded efficiently by a high-speed molding into scarcely deformable larger molded articles of better appearance with high stiffness.

Another object of the present invention is to provide a process which can afford to produce the above-mentioned polypropylene resin composition in an efficient and simple manner at a lower cost.

A further object of the present invention is to provide a resin composition to be used for blow-molding which has a high melt tension and is superior in the moldability and which can be molded by a high-speed molding into scarcely deformable large-sized blow-molded articles of better appearance with superior stiffness.

A still further object of the present invention is to provide a scarcely deformable blow-molded article of better appearance which is made of the above-mentioned polypropylene resin composition or of the above-mentioned resin composition to be used for blow-molding and which will scarcely suffer from occurrence of draw-down of the parison and, thus, can be produced at a high speed in an efficient manner.

A still further object of the present invention is to provide a vacuum-formed or pressure-formed article made of the above-mentioned polypropylene resin composition, which may have a large size and which has a better appearance with superior stiffness and can be molded by a high-speed molding with permission of deep drawing.

A still further object of the present invention is to provide a calendered article made of the above-mentioned polypropylene resin composition, which may have a large size and which has a better appearance, superior stiffness, superior gloss and scarce thickness irregularity and can be formed by a high-speed forming.

A still further object of the present invention is to provide an extruded article made of the above-mentioned polypropylene resin composition, wherein the said article may have a large size, allow high-speed forming and exhibit a better appearance and superior stiffness.

A still further object of the present invention is to provide a stretched film which is made of the above-mentioned polypropylene resin composition and has a superior thickness accuracy, wherein the said film may have a large size and can be obtained by a high-speed forming in a stable manner without suffering from breaking of the film during stretching.

A still further object of the present invention is to provide a film superior in the stiffness, in the appearance and in the transparency which is made of the above-mentioned polypropylene resin composition and is produced by inflation technique, wherein the said film may have a large size and can be obtained by a high-speed forming under stable formation of the baloon upon the inflation molding.

A still further object of the present invention is to provide a foamed article which is made of the above-mentioned polypropylene resin composition and which has a uniform and fine cellular structure with a high foaming ratio, wherein the said article may have a large size and can be produced in a high-speed molding.

DISCLOSURE OF THE INVENTION

The present invention provides for the following polypropylene resin composition and process for the production and use of such resin composition:

(1) A polypropylene resin composition comprising polypropylene as a main component and having the following characteristic features 1) to 4), namely,
1) that the melt flow rate (MFR), determined at 230° C. under a load of 2.16 kg, is in the range of 0.01–5 g/10 min.,
2) that the content of a high molecular weight polypropylene exhibiting an intrinsic viscosity [η], determined at 135° C. in decalin, of 8–13 dl/g is in the range of 15–50% by weight,
3) that the gel areal density in number is 3,000/450 cm$^2$ or less and
4) that the molecular weight distribution, determined by gel permeation chromatography (GPC), is in the range of 6–20 for Mw/Mn and is 3.5 or higher for Mz/Mw.

(2) A polypropylene resin composition according to the above (1), wherein it has further the following feature 5), namely,
  5) that the isotactic pentad fraction (mmmm fraction) determined by $^{13}$C-NMR is at least 97%.
(3) A polypropylene resin composition according to the above (1) or (2), wherein it has further the following characteristic feature 6), namely,
  6) that, when dividing the area underlying under the molecular weight distribution curve on the molecular weight distribution diagram obtained by gel permeation chromatography at the maximum peak molecular weight into two halves, the ratio of the surface area $S_H$ for the higher molecular weight side half to the surface area $S_L$ for the lower molecular weight side half, namely, $S_H/S_L$, is at least 1.3 and the proportion of the area for the high molecular weight part having molecular weights of at least $1.5 \times 10^6$ relative to the integral surface area underlying under the entire molecular weight distribution curve is at least 7%.
(4) A polypropylene resin composition according to either one of the above (1) to (3), wherein it has further the following characteristic feature 7), namely,
  7) that the melt tension (MT), determined by flow tester at 230° C., is in the range of 5–30 g.
(5) A process for producing a polypropylene resin composition as defined in either one of the above (1) to (4), by polymerizing propylene by a multistage polymerization in at least two stages in the presence of a polymerization catalyst formed from
  (a) a solid catalyst component based on titanium, containing magnesium, titanium, a halogen and an electron donor,
  (b) a catalyst component based on organometallic compound and
  (c) a catalyst component based on organosilicic compound having at least one group selected from the group consisting of cyclopentyl, cyclopentenyl, cyclopentadienyl and derivatives of them, the said process comprising,
    making up, in the first polymerization stage, a high molecular weight polypropylene product having an intrinsic viscosity [η] of 8–13 dl/g up to a proportion of 15–50% by weight with respect to the total amount of the finally obtained polypropylene resin composition, by polymerizing propylene under substantial absence of hydrogen and
    performing, then, in each of the second and succeeding polymerization stages, polymerization of propylene in such a manner that a polypropylene product having an intrinsic viscosity [η] lower than 8 dl/g is produced and that the melt flow rate (MFR) of the finally obtained polypropylene resin composition, as a whole, will be in the range of 0.01–5 g/10 min.
(6) A process as defined in the above (5), wherein the polymerization of propylene in each polymerization stage is effected in a continuous way.
(7) A process as defined in the above (5) or (6), wherein the polymerization of propylene in the second and succeeding polymerization stages is effected using at least two polymerization reactors.
(8) A polypropylene resin composition comprising polypropylene as a main component and having the following characteristic features 1), 2), 4), 5), 7) and 8), namely,
  1) that the melt flow rate (MFR), determined at 230° C. under a load of 2.16 kg, is in the range of 0.01–20 g/10 min.,
  2) that the content of a high molecular weight polypropylene exhibiting an intrinsic viscosity [η], determined at 135° C. in decalin, of 8–13 dl/g is in the range of 20–50% by weight,
  4) that the molecular weight distribution, determined by gel permeation chromatography (GPC), is in the range of 6–20 for Mw/Mn and is 4 or higher for Mz/Mw,
  5) that the isotactic pentad fraction (mmmm fraction) determined by $^{13}$C-NMR is at least 97%,
  7) that the melt tension (MT), determined by flow tester at 230° C., is in the range of 5–30 g, and
  8) that the relationship between the melt tension (MT), determined by flow tester at 230° C., and the critical shearing rate (SRc) meets the following formula (I)

$$MT > -4.16 \times Ln(SRc) + 29 \quad (I)$$

in which MT represents the melt tension in gram, SRc represents the critical shearing rate in sec$^{-1}$ and Ln indicates the natural logarithm.
(9) A polypropylene resin composition as defined in the above (8), wherein it has further the following characteristic feature 3), namely,
  3) that the gel areal density in number is 3,000/450 cm$^2$ or less.
(10) A polypropylene resin composition for blow molding comprising polypropylene as a main component and having the following characteristic features 1), 2), 4), 5), 7) and 8), namely,
  1) that the melt flow rate (MFR), determined at 230° C. under a load of 2.16 kg, is in the range of 0.01–20 g/10 min.,
  2) that the content of a high molecular weight polypropylene exhibiting an intrinsic viscosity [η], determined at 135° C. in decalin, of 8–13 dl/g is in the range of 20–50% by weight,
  4) that the molecular weight distribution, determined by gel permeation chromatography (GPC), is in the range of 6–20 for Mw/Mn and is 4 or higher for Mz/Mw,
  5) that the isotactic pentad fraction (mmmm fraction) determined by $^{13}$C-NMR is at least 97%,
  7) that the melt tension (MT), determined by flow tester at 230° C., is in the range of 5–30 g, and
  8) that the relationship between the melt tension (MT), determined by flow tester at 230° C., and the critical shearing rate (SRc) meets the following formula (I)

$$MT > -4.16 \times Ln(SRc) + 29 \quad (I)$$

in which MT represents the melt tension in gram, SRc represents the critical shearing rate in sec$^{-1}$ and Ln indicates the natural logarithm.
(11) A polypropylene resin composition as defined in either one of the above (1) to (4) and (8) and (9), which is for blow molding.
(12) A resin composition for blow molding, comprising a polypropylene resin composition defined in any one of the above (1) to (4) and (8) to (10).
(13) A blow-molded article produced by subjecting a resin composition defined in any one of the above (1) to (4) and (8) to (12) to a blow molding.
(14) A vacuum-formed or pressure-formed article produced by subjecting a polypropylene resin composition as defined in any one of the above (1) to (4) and (8) and (9) to a vacuum- or pressure forming.

(15) A calendered article produced by subjecting a polypropylene resin composition as defined in any one of the above (1) to (4) and (8) and (9) to a calendering.

(16) A foamed article produced by subjecting a polypropylene resin composition as defined in any one of the above (1) to (4) and (8) and (9) to foaming.

(17) An extrusion-molded article produced by subjecting a polypropylene resin composition as defined in any one of the above (1) to (4) and (8) and (9) to an extrusion molding.

(18) A stretched film produced by subjecting a sheet or film made of a polypropylene resin composition as defined in any one of the above (1) to (4) and (8) and (9) to a stretching.

(19) An inflation film produced by subjecting a polypropylene resin composition as defined in any one of the above (1) to (4) and (8) and (9) to an inflation molding.

In the context of this specification, a mere denotation of "the polypropylene resin composition according to the present invention" does comprehend both the first and the second polypropylene resin compositions as described below.

The First Polypropylene Resin Composition

The first polypropylene resin composition according to the present invention comprises polypropylene as a predominant component and having, for the resin composition as a whole, the following characteristic features 1), 2), 3) and 4), wherein the first polypropylene resin composition may either comprise exclusively polypropylene or comprise other resin(s) than polypropylene in a small proportion:

1) A melt flow rate (MFR), determined in accordance with ASTM D 1238 at 230° C. under a load of 2.16 kg, in the range of 0.01–5 g/10 min., preferably 0.1–5 g/10 min., more preferably 0.3–4 g/10 min.

2) A content of a high molecular weight polypropylene having an intrinsic viscosity [η], determined at 135° C. in decalin (decahydronaphthalene), of 8–13 dl/g, preferably 8.5–12 dl/g, more preferably 9–11 dl/g, in the range of 15–50% by weight, preferably 15–40% by weight, more preferably 15–35% by weight.

3) An areal density of gel in number of 3,000 per 450 cm$^2$ or less, preferably 2,500 per 450 cm$^2$ or less, more preferably 2,000 per 450 cm$^2$ or less.

4) A molecular weight distribution, determined by gel permeation chromatography (GPC), in the range of 6–20, preferably 8–20 for Mw/Mn (weight-average molecular weight/number-average molecular weight) and of 3.5 or higher, preferably in the range of 3.5–6 for Mz/Mw (z-average molecular weight/weight-average molecular weight).

The a real density of number of gel mentioned above is expressed by the number of gels per a unit film surface area (450 cm$^2$) converted from the number of gels detected using a commercial gel counter on a film of 30 μm thickness prepared by a T-die film-forming apparatus of 25 mmφ.

A molecular weight distribution expressed by Mw/Mn of a value in the range of 6–20 and by Mz/Mw of not lower than 3.5 does mean that the first polypropylene resin composition according to the present invention has a wider distribution in higher molecular weight ranges as compared with that of conventional polypropylene resin products.

For the first polypropylene resin composition according to the present invention, preference is given for those which have, in addition to the above characteristic features 1) to 4), further the following characteristic feature 5):

5) An isotactic pentad fraction (mmmm fraction) determined by $^{13}$C-NMR of at least 97%, preferably 98.0–99.5%.

The isotactic pentad fraction (mmmm fraction) serves as a parameter of isotacticity of polypropylene, wherein the higher this value, the higher is the isotacticity. An isotactic pentad fraction of 97% or higher does indicate that the isotacticity of the polypropylene is high. The above-mentioned isotactic pentad fraction (mmmm fraction) corresponds to the proportion of the isotactic chains as the pentad unit in the polypropylene molecular chains, which is determined using $^{13}$C-NMR and which is the proportion of the number of propylene monomeric units present in each center of the sequences of 5 monomeric propylene units bound each successively by meso-coupling. This can be determined in the practice as the proportion of the mmmm peaks relative to the entire absorption peaks within the methyl carbon region in the $^{13}$C-NMR spectrum.

For the first polypropylene-based resin composition according to the present invention, preference is given also for those which has, in addition to the above characteristic features 1) to 4) or the features 1) to 5), further the following characteristic feature 6), namely, 6) that, when dividing the area underlying under the molecular weight distribution curve on the molecular weight distribution diagram obtained by gel permeation chromatography at the maximum peak molecular weight into two halves, the ratio of the surface area $S_H$ for the higher molecular weight side half to the surface area $S_L$ for the lower molecular weight side half, namely, $S_H/S_L$, is at least 1.3, preferably at least 1.35, more preferably in the range of 1.4–2, and the proportion of the area in this diagram under the molecular weight distribution curve for the high molecular weight part of molecular weights of at least $1.5 \times 10^6$ relative to the integral surface area underlying under the entire distribution curve is at least 7%, preferably 7.5% or higher, more preferably in the range of 9–40%.

The surface area on the high molecular weight side $S_H$ mentioned above is the surface area of the higher molecular weight side half resulting when subdividing, on the molecular weight distribution diagram, the area confined between the molecular weight distribution curve prepared using gel permeation chromatography and the axis of abscissa (molecular weight) thereof by the vertical line at the maximum peak molecular weight into two halves. The surface area $S_L$ stands for the lower molecular weight side half thereof.

The ratio of the surface area $S_H$ of the higher molecular weight side half to the surface area $S_L$ of the lower molecular weight side half ($S_H/S_L$) refers to the shape of the molecular weight distribution curve of the polypropylene product. Thus, the case of $S_H/S_L>1$ corresponds to a molecular weight distribution curve in which a bulging of the curve indicating existence of polymers of higher molecular weights is present on the high molecular weight side of the curve. In the case of $S_H/S_L<1$, the molecular weight distribution curve has a bulging on the low molecular weight side, indicating a content of lower molecular weight polymers. In the case of $S_H/S_L=1$, the molecular weight distribution curve has a shape in which the high molecular weight side and the low molecular weight side are balanced.

The proportion of the high molecular weight side half of the polymer product corresponds to the ratio of the surface area in the molecular weight distribution diagram for the molecular weights of $1.5 \times 10^6$ and higher confined between the molecular weight distribution curve and the base line (the axis of abscissa; for the molecular weight), relative to the entire surface area for all the molecular weights confined between the molecular weight distribution curve and the base line. When this proportion exceeds a certain definite value, it means that a polymer fraction of molecular weights higher than $1.5 \times 10^6$ is present in the polypropylene resin composition. At least a part of this high molecular weight fraction consists of a polymer fraction having an intrinsic viscosity $[\eta]$ of 8–13 dl/g.

For the first polypropylene resin composition according to the present invention, preference is also given for those which have, in addition to the above characteristic features 1) to 4), 1) to 5) or 1) to 6), further the following characteristic feature 7):

7) A melt tension (MT), determined by flow tester at 230° C., is in the range of 5–30 g, preferably 5–20 g.

The melt tension (MT) refers to a tension in molten state observed at 230° C., which is determined using Flow Tester having an orifice of a diameter of 2.095 mm and a length of 8 mm by extruding the polypropylene resin composition in molten state through the orifice of flow tester at a temperature of 230° C. at an extrusion velocity of 15 mm/min., wherein the resin strand extruded from the orifice is guided through a pulley provided with a sensor and is wound up around the pulley at a velocity of 10 m/min., in order to observe the force imposed onto the pulley.

The first polypropylene resin composition according to the present invention provides for a high melt tension and superior in the moldability and in the stiffness, since the melt flow rate thereof is in the above-identified specific range and the content of the high molecular weight polypropylene fraction is in the range mentioned above and, in addition, the molecular weight distribution value is in the above range.

The polypropylene constituting the predominant component of the first polypropylene resin composition according to the present invention may preferably be composed exclusively of the structural unit derived from propylene, though it may include other structural unit(s) derived from other comonomer(s) than propylene in a small proportion, such as 10 mole % or lower, preferably 5 mole % or lower. Such other comonomer may include, for example, α-olefins other than propylene, such as ethylene, 1-butene, 1-pentene, 1-hexene, 4-methyl-1-pentene, 3-methyl-1-pentene, 1-heptene, 1-octene, 1-nonene, 1-decene and 1-dodecene; vinyl compounds, such as styrene, vinylcyclopentene, vinylcyclohexane and vinylnorbornane; vinyl esters, such as vinyl acetate and the like; unsaturated organic acids and derivatives thereof, such as maleic anhydride and the like; conjugated diene compounds; non-conjugated polyenes, such as dicyclopentadiene, 1,4-hexadiene, dicyclooctadiene, methylenenorbornene and 5-ethylidene-2-norbornene. Among them, preference is given to ethylene and α-olefins having 4–10 carbon atoms. They may be present as copolymers of two or more of them.

The first polypropylene resin component according to the present invention may contain, as a prepolymer, 0.1% by weight or less, preferably 0.05% by weight or less, of a homopolymer or copolymer of branched olefins, for example, 3-methyl-1-butene, 3,3-dimethyl-1-butene, 3-methyl-1-pentene, 3-ethyl-1-pentene, 4-methyl-1-pentene, 3-methyl-1-hexene, 4-methyl-1-hexene, 4,4-dimethyl-1-hexene, 4,4-dimethyl-1-pentene, 4-ethyl-1-hexene, 3-ethyl-1-hexene, 3,5,5-trimethyl-1-hexene, vinylcyclopentane, vinylcyclohexane, vinylcycloheptane, vinylnorbornane, allylnorbornane, styrene, dimethylstyrene, allylbenzene, allyltoluene, allylnaphthalene and vinylnaphthalene. Among them, special preference is given to 3-methyl-1-butene and the like.

The polypropylene constituting the first polypropylene resin composition according to the present invention may also be a block-copolymer of propylene, which is favorable due to a possible attainment of a superior impact resistance in addition to a superior stiffness, wherein special preference is given to a propylene/ethylene block-copolymer of which rubber part has an intrinsic viscosity $[\eta]$ of 0.5–10 dl/g.

The polypropylene product constituting the first polypropylene resin composition may preferably be produced in a multistage polymerization with two or more stages so as to contain propylene polymers of from relatively higher molecular weights to relatively lower molecular weights. In the case where the first polypropylene resin composition is constituted exclusively of polypropylene, it is preferable to produce it in a multistage polymerization with two or more stages so as to contain propylene polymers of from relatively higher molecular weights to relatively lower molecular weights in such a way that the characteristic features 1) to 4), 1) to 5), 1) to 6) or 1) to 7) described above are attained.

As a preferred process for producing the first polypropylene resin composition according to the present invention, there may be exemplified a process in which propylene is subjected solely or together with other comonomer(s) to a multistage polymerization of at least two stages in the presence of a catalyst for producing high isotactic polypropylene. Concretely, propylene is polymerized in the first stage polymerization in the presence of a polymerization catalyst constituted of (a) a solid catalyst component based on titanium comprising magnesium, titanium, a halogen and an electron donor, (b) a catalyst component based on organometallic compound and (c) a catalyst component based on organosilicic compound having at least one substituent selected from the group consisting of cyclopentyl, cyclopentenyl, cyclopentadienyl and derivatives of them in substantial absence of hydrogen to produce 15–50%, preferably 15–40%, more preferably 15–35%, based on the total weight of the finally obtained entire polypropylene resin composition, of a polypropylene product of relatively higher molecular weight having an intrinsic viscosity, determined in decalin at 135° C., of 8–13 dl/g, preferably 8.5–12 dl/g, more preferably 9–11 dl/g, whereupon a polypropylene product of relatively lower molecular weight is produced in the second and subsequent polymerization stages. The polymerization for producing the polypropylene product of relatively lower molecular weight produced in the second and the subsequent stages is adjusted in such a manner that the intrinsic viscosity ($\eta$) of the polypropylene product obtained will be lower than 8 dl/g (which refers to the intrinsic viscosity ($\eta$) of the entire polypropylene resin composition including all those which are produced in the stages preceding thereto) and the melt flow rate (MFR) of the finally obtained polypropylene resin composition, as a whole, will be in the range of 0.01–5 g/10 min., preferably 0.1–5 g/10 min., more preferably 0.3–4 g/10 min. For the practical way for adjusting the intrinsic viscosity ($\eta$) of the polypropylene produced in the second or subsequent stage, there is no special limitation, while it is preferable to use hydrogen as the molecular weight regulator.

As the sequential order of the production, it is preferable to produce the polypropylene of relatively higher molecular weight in the first stage under substantial absence of hydrogen and to produce then, in the second or subsequent stage(s), the polypropylene of relatively lower molecular weight. While it may be possible to reverse the polymerization order, it should be necessary therefor to incorporate exhaustive elimination of the molecular weight regulator, such as hydrogen, included in the first stage reaction product before the initiation of polymerization in the second or subsequent stage(s), in order to produce a polypropylene product of relatively lower molecular weight in the first stage and to produce polypropylene product(s) of relatively higher molecular weight in the second and the subsequent stages, so that employment of an intricated apparatus becomes necessary and attainment of increase in the intrinsic viscosity [η] of the polypropylene product in the second and the subsequent stages may not be easy.

The polymerization in each stage may be realized either continuously or in a batchwise process. The polymerization may be performed in a known practice, for example, by slurry polymerization or bulk polymerization. The polymerization in the second and the subsequent stages may preferably be carried out subsequently to the first stage polymerization in a continuous manner. When a batch process is employed, the multistage polymerization can be effected in one single reactor.

While it is favorable to carry out the polymerization of propylene in each stage in a continuous manner in order to produce the first polypropylene resin composition according to the present invention in an efficient and economical way, a continuous polymerization may often bring about occurrence of gel formation. In order to suppress gel formation as scarce as possible, it is favorable to carry out the production of the polypropylene product of relatively lower molecular weight in the second and the subsequent stages using at least two polymerization reactors, preferably at least three reactors in a continuous manner in each reactor and to perform transference of the polymerization product from a reactor to another reactor also in a continuous way. By performing the production of polypropylene products in the second and the subsequent stages continuously using a plurality of reactors, a polypropylene resin composition exhibiting scarce occurrence of gel formation can be obtained.

The Second Polypropylene Resin Composition

The second polypropylene resin composition according to the present invention comprises polypropylene as a main component and has, for the resin composition as a whole, the characteristic features 1), 2), 4), 5), 7) and 8) given below. The second polypropylene resin composition may either be constituted exclusively of polypropylene or contain other resin(s) than polypropylene in a small proportion.

1) A melt flow rate (MFR), determined according to ASTM D1238 at 230° C. under a load of 2.16 kg, in the range of 0.01–20 g/10 min., preferably 0.05 –10 g/10 min.

2) A content of a high molecular weight part polypropylene having an intrinsic viscosity [η], determined at 135° C. in decalin, of 8–13 dl/g, preferably of 8.5–12 dl/g, in the range of 20–50% by weight, preferably 25–45% by weight.

4) A molecular weight distribution, determined by gel permeation chromatography (GPC), in the range of 6–20, preferably 6–13 for Mw/Mn (weight-average molecular weight/number-average molecular weight) and 4 or higher, preferably in the range of 4–7 for Mz/Mw (z-average molecular weight/weight-average molecular weight).

5) An isotactic pentad fraction (mmmm fraction), determined by 13C-NMR, of at least 97%, preferably in the range of 98.0–99.5%.

7) A melt tension (MT), determined by flow tester at 230° C., in the range of 5–30 g, preferably 8–30 g.

8) A relationship between the melt tension (MT), determined by flow tester at 230° C., and the critical shearing rate (SRc) satisfying the following formula (I) or, preferably, following formula (I'), namely, $$MT > -4.16 \times Ln(SRc) + 29 \quad (I)$$
$$MT > -4.16 \times Ln(SRc) + 33 \quad (I')$$

in which MT represents the melt tension in gram, SRc represents the critical shearing rate in $\sec^{-1}$ and Ln indicates the natural logarithm.

The isotactic pentad fraction (mmmm fraction) and the melt tension (MT) can be determined in the same method as described previously in the disclosure of the first polypropylene resin composition. The critical shearing rate (SRc) represents the shearing velocity at which melt fracture commences and can be determined using Flow Tester provided with an orifice having a diameter of 1 mm and a length of 10.9 mm by extruding the molten polypropylene resin composition through the orifice at a temperature of 230° C. at an extrusion velocity of 0.5 mm/min. under successive increase of the extrusion velocity, in order to observe the extrusion velocity at which melt fracture of the extruded strand begins to occur.

The molecular weight distribution expressed by an Mw/Mn value of 6–20 and an Mz/Mw value of 4 or higher indicates that the molecular distribution of the second polypropylene resin composition according to the present invention is more widely shifted towards high molecular weight side as compared with ordinary polypropylene product.

For the second polypropylene resin composition according to the present invention, preference is given to those which have further, in addition to the characteristic features 1), 2), 4), 5), 7) and 8), the following characteristic feature 3):

3) A gel areal density, as determined by the method explained previously, in number of 3,000/450 $cm^2$ or less, preferably 2,500/450 $cm^2$ or less, more preferably 2,000/450 $cm^2$ or less.

The second polypropylene resin composition according to the present invention has a high melt tension and is superior in the moldability and in the stiffness as well, since the molecular weight distribution is within the specific range as above and the melt tension is in a specific relation with the critical shearing rate.

The polypropylene product to be present as the main component of the second polypropylene resin composition according to the present invention may preferably be composed exclusively of the structural unit derived from propylene, though it may include other structural unit(s) derived from other comonomer(s) than propylene in a small proportion, such as 10 mole % or lower, preferably 5 mole % or lower. Such other comonomer may include, for example, α-olefins other than propylene, such as ethylene, 1-butene, 1-pentene, 1-hexene, 4-methyl-1-pentene, 3-methyl-1-pentene, 1-heptene, 1-octene, 1-nonene, 1-decene and 1-dodecene; vinyl compounds, such as styrene, vinylcyclopentene, vinylcyclohexane and vinylnorbornane; vinyl esters, such as vinyl acetate and the like; unsaturated organic acids and derivatives thereof, such as maleic anhydride and the like; conjugated diene compounds; non-conjugated polyenes, such as dicyclopentadiene, 1,4-hexadiene, dicyclooctadiene, methylenenorbornene and 5-ethylidene-2-norbornene. Among them, preference is given to ethylene and α-olefins having 4–10 carbon atoms. They may be present as copolymers of two or more of them.

The second polypropylene resin component according to the present invention may contain, as a prepolymer, 0.1% by weight or less, preferably 0.05% by weight or less, of a homopolymer or copolymer of branched olefins, for example, 3-methyl-1-butene, 3,3-dimethyl-1-butene, 3-methyl-1-pentene, 3-ethyl-1-pentene, 4-methyl-1-pentene, 3-methyl-1-hexene, 4-methyl-1-hexene, 4,4-dimethyl-1-hexene, 4,4-dimethyl-1-pentene, 4-ethyl-1-hexene, 3-ethyl-1-hexene, 3,5,5-trimethyl-1-hexene, vinylcyclopentane, vinylcyclohexane, vinylcycloheptane, vinylnorbornane, allylnorbornane, styrene, dimethylstyrene, allylbenzene, allyltoluene, allylnaphthalene and vinylnaphthalene. Among them, special preference is given to 3-methyl-1-butene and the like.

The polypropylene constituting the second polypropylene resin composition according to the present invention may also be a block-copolymer of propylene, which is favorable due to a possible attainment of a superior impact resistance in addition to a superior stiffness, wherein special preference is given to a propylene/ethylene block-copolymer of which rubber part has an intrinsic viscosity [η] of 0.5–10 dl/g.

For the polypropylene product constituting the second polypropylene resin composition according to the present invention, a polypropylene product exhibiting the characteristic features 1), 2), 4), 5), 7) and 8) or the characteristic features 1) to 5), 7) and 8) may be employed as such therefor, so long as it can be produced within a single stage polymerization, while the polypropylene product comprises polymers of widespread molecular weights from relatively lower ones to relatively higher ones. While it is permissible here to produce polypropylene products having different molecular weights separately and blend them by melt-mixing, it is preferable to produce polypropylene products having different molecular weights in a multi-stage polymerization of at least two stages to thereby obtain a product comprising polymers of wide variety of molecular weights of relatively lower to relatively higher ones. While it is permissible to produce the polypropylene products of relatively higher molecular weights and the polypropylene products of relatively lower molecular weights separately but not in a multistage polymerization and, then, to blend them together by melt mixing, this causes a tendency to gel-formation and is not favorable. For a favorable practice for producing the second polypropylene resin composition according to the present invention, there may be exemplified a process in which propylene is polymerized alone or together with other comonomer(s) in the presence of a catalyst for producing stereospecific polypropylene in a multistage polymerization of at least two stages.

As a concrete practice for realizing multistage polymerization, there may be exemplified a process of two-stage polymerization, which comprises producing, in a first stage, 20–50%, preferably 25–45%, based on the weight of the finally obtained polypropylene resin composition as a whole, of a polypropylene product of relatively higher molecular weight having an intrinsic viscosity [η], determined at 135° C. in decalin, of 8–13 dl/g, preferably 8.5–12 dl/g, and producing, in a second stage, 50–80%, preferably 55–75%, based on the weight of the finally obtained polypropylene resin composition as a whole, of a polypropylene product of relatively lower molecular weight having an intrinsic viscosity [η] (this intrinsic viscosity [η] refers to the intrinsic viscosity [η] of the polypropylene product produced in the second stage solely containing no polypropylene product produced in the first stage) of 0.8–4 dl/g.

There may also be exemplified alternatively a process of three-stage polymerization for producing the second polypropylene resin composition according to the present invention, which comprises producing, in the first stage, 20–50%, preferably 25–45%, based on the weight of the finally obtained polypropylene resin composition as a whole, of a polypropylene product of relatively higher molecular weight having an intrinsic viscosity [η], determined at 135° C. in decalin, of 8–13 dl/g, preferably 8.5–12 dl/g, and producing, in the second stage, a polypropylene product in such a manner that the intrinsic viscosity [η] of the entire product as a whole (this intrinsic viscosity [η] refers to the intrinsic viscosity [η] of the entire polypropylene product containing the polypropylene product produced in the first stage) of 3–10 dl/g and producing, in the third stage, a polypropylene product in such a manner that the intrinsic viscosity [η] of the entire product as a whole (this intrinsic viscosity [η] refers to the intrinsic viscosity [η] of the entire polypropylene product containing the polypropylene products produced in the first and the second stages) of 0.8–6 dl/g.

In the above multistage polymerization, the first stage polymerization may preferably be performed under substantial absence of hydrogen. For the sequence of polymerization course, it is preferable to carry out the production of the polypropylene of relatively higher molecular weight in the first stage and to effect thereafter production of the polypropylene product(s) of relatively lower molecular weight in the subsequent stage(s). While the production sequence may be reversed, it should be necessary therefor to incorporate exhaustive elimination of the molecular weight regulator, such as hydrogen, included in the first stage reaction product before the initiation of polymerization in the second or subsequent stage(s), in order to produce a polypropylene product of relatively lower molecular weight in the first stage and to produce a polypropylene product of relatively higher molecular weight in the second and the subsequent stages, so that employment of an intricated apparatus becomes necessary and attainment of increase in the intrinsic viscosity [η] of the polypropylene product in the second and the subsequent stages may not be easy.

The polymerization in each stage may be realized either continuously or in a batchwise process. The polymerization may be performed in a known practice, for example, by slurry polymerization or by bulk polymerization. The polymerization in the second and the subsequent stages may preferably be carried out subsequently to the first stage polymerization in a continuous manner. When a batch process is employed, the multistage polymerization can be effected in one single reactor.

While it is favorable to carry out the polymerization of propylene in each stage in a continuous manner in order to produce the first polypropylene resin composition according to the present invention in an efficient and economical way, a continuous polymerization may often bring about occurrence of gel formation. In order to suppress gel formation as scarce as possible, it is favorable to carry out the production of the polypropylene product of relatively lower molecular weight in the second and the subsequent stages using at leat two polymerization reactors, preferably at least three reactors, in a continuous manner in each reactor and to perform transference of the polymerization product from a reactor to another reactor also in a continuous way. By performing the production of polypropylene products continuously using a plurality of reactors, a polypropylene resin composition exhibiting scarce occurrence of gel formation can be obtained.

For the catalyst for producing the highly stereospecific polypropylene to be used in the production of the first and the second polypropylene resin compositions according to the present invention, there may be employed various known catalysts, for example, a catalyst composed of (a) a solid catalyst component based on titanium, which has contents of magnesium, titanium, halogen and an electron donating agent, (b) an organometallic compound catalyst component (c) an organosilicic compound catalyst component having at least one substituent selected from the group consisting of cyclopentyl, cyclopentenyl, cyclopentadienyl and their derivatives.

The solid catalyst based on titanium (a) mentioned above can be prepared by bringing a magnesium compound (a-1), a titanium compound (a-2) and an electron donor (a-3) into contact with each other.

As the magnesium compound (a-1), there may be enumerated magnesium compounds having reducing ability, such as compounds having carbon-to-magnesium bond or magnesium-to-hydrogen bond, and magnesium compounds having no reducing ability, such as those represented by magnesium halogenides, alkoxymagnesium halides, aryloxymagnesium halides, alkoxymagnesiums, aryloxymagnesiums and carboxylic acid salts of magnesium.

In preparing the titanium-based solid catalyst component (a), it is preferable that, for example, a tetravalent titanium compound represented by the formula (1) given below is employed as the titanium compound (a-2).

$$Ti(OR)_g X_{4-g} \qquad (1)$$

In the formula (1), R represents a hydrocarbon group, X denotes a halogen atom and g is in the range of $0 \leq g \leq 4$.

Concrete examples of the above titanium compound represented by the formula (1) include titanium tetrahalides, such as $TiCl_4$, $TiBr_4$ and $TiI_4$; alkoxytitanium trihalides, such as $Ti(OCH_3)Cl_3$, $Ti(OC_2H_5)Cl_3$, $Ti(O-n-C_4H_9)Cl_3$, $Ti(OC_2H_5)Br_3$, and $Ti(O-iso-C_4H_9)Br_3$; dialkoxytitanium dihalides, such as $Ti(OCH_3)_2Cl_2$, $Ti(OC_2H_5)_2Cl_2$, $Ti(O-n-C_4H_9)_2Cl_2$ and $Ti(OC_2H_5)_2Br_2$; trialkoxytitanium monohalides, such as $Ti(OCH_3)_3Cl$, $Ti(OC_2H_5)_3Cl$, $Ti(O-n-C_4H_9)_3Cl$ and $Ti(OC_2H_5)_3Br$; and tetraalkoxytitanium, such as $Ti(OCH_3)_4$, $Ti(OC_2H_5)_4$, $Ti(O-n-C_4H_9)_4$, $Ti(O-iso-C_4H_9)_4$ and $Ti(O-2-ethylhexyl)_4$.

For the electron donor (a-3) to be incorporated in the preparation of the titanium-based solid catalyst component (a), there may be exemplified alcohols, phenols, ketones, aldehydes, esters of organic or inorganic acids, organic acid halides, ethers, acid amides, acid anhydrides, ammonia, amines, nitriles, isocyanates, nitrogen-containing cyclic compounds and oxygen-containing cyclic compounds.

In contacting the magnesium compound (a-1), the titanium compound (a-2) and the electron donor (a-3) with each other, it is permissible that other reaction reagent, such as silicium, phosphorus or aluminum, may be caused to be present simultaneously and it is also permissible to incorporate a solid catalyst carrier for preparing a carrier-supported solid titanium catalyst component (a).

The titanium-based solid catalyst component (a) may be prepared by any technique including known one. Examples of such preparation technique are given below in a brief description:

(1) A technique in which a solution of the magnesium compound (a-1) in a hydrocarbon solvent containing the electron donor (the liquefying agent) (a-3) is brought into contact with the organometallic compound to cause a reaction to presipitate solid matter which is then, or in the course of precipitation, brought into contact with the titanium compound (a-2) to cause reaction.

(2) A technique in which a complex composed of the magnesium compound (a-1) and the electron donor (a-3) is brought into contact with the organometallic compound to cause reaction and, then, the titanium compound (a-2) is caused to contact and react therewith.

(3) A technique in which the contacted product from the contact of an inorganic carrier with an organomagnesium compound (a-1) is brought into contact with the titanium compound (a-2) and with the electron donor (a-3) to cause reaction therebetween. Here, it is permissible to bring the product of contact of the carrier with the magnesium compound into contact with a halogen-containing compound and/or an organometallic compound preliminarily.

(4) A technique, wherein a solid carrier, which is obtained from a mixture containing a solution of the magnesium compound (a-1), the electron donor (a-3) and the carrier in a liquid medium of the liquefying agent and, optionally, a hydrocarbon solvent and on which the magnesium compound (a-1) is supported, is contacted with the titanium compound (a-2).

(5) A technique in which a solution containing the magnesium compound (a-1), the titanium compound (a-2), the electron donor (a-3) and, optionally, a hydrocarbon solvent is brought into contact with a solid carrier.

(6) A technique in which an organomagnesium compound (a-1) in liquid form and a halogen-containing titanium compound (a-2) are brought into contact with each other. In this case, the electron donor (a-3) is used at least once.

(7) A technique in which an organomagnesium compound (a-1) in liquid form and a halogen-containing titanium compound (a-2) are brought into contact with each other, whereupon the resulting product is caused to contact with the titanium compound (a-2). In this case, the electron donor (a-3) is used at least once.

(8) A technique in which an alkoxyl group-containing magnesium compound (a-1) is brought into contact with a halogen-containing titanium compound (a-2). In this case, the electron donor (a-3) is used at least once.

(9) A technique in which a complex composed of an alkoxyl group-containing magnesium compound (a-1) and of the electron donor (a-3) is brought into contact with the titanium compound (a-2).

(10) A technique in which a complex composed of an alkoxyl group-containing magnesium compound (a-1) and the electron donor (a-3) is brought into contact with an organometallic compound, whereupon the resulting product is brought into contact with the titanium compound (a-2).

(11) A technique in which the magnesium compound (a-1), the electron donor (a-3) and the titanium compound (a-2) are brought into contact with each other in a voluntary order to cause reactions therebetween. It is permissible to incorporate a pretreatment of each reaction component before these reactions using a reaction assistant, such as an electron donor (a-3), an organometallic compound, a halogen-containing silicium compound or the like.

(12) A technique in which a liquid magnesium compound (a-1) exhibiting no reducing function is caused to react with a liquid titanium compound (a-2) in the presence of the electron donor (a-3) to deposit a solid magnesium/titanium composite product.

(13) A technique in which the reaction product obtained in the above (12) is further reacted with the titanium compound (a-2).

(14) A technique in which the reaction product obtained in the above (11) or (12) is further reacted with the electron donor (a-3) and with the titanium compound (a-2).

(15) A technique in which a solid mixture obtained by crushing the magnesium compound (a-1), the titanium compound (a-2) and the electron donor (a-3) is treated with either an elementary halogen, a halogen compound or an aromatic hydrocarbon. In this case, it is permissible to incorporate a process step of crushing either the magnesium compound (a-1) solely, a complex composed of the magnesium compound (a-1) and of the electron donor (a-3) or the magnesium compound (a-1) and the titanium compound (a-2). It is also permissible to subject the crushed product to a pretreatment with a reaction assistant, followed by an after-treatment with, such as, an elementary halogen. As the reaction assistant, for example, an organometallic compound or a halogen-containing silicium compound, may be employed.

(16) A technique in which the magnesium compound (a-1) is crushed and the resulting crushed product is brought into contact with the titanium compound (a-2). Upon crushing and/or contacting the magnesium compound (a-1), an electron donor (a-3) may, if necessary, be employed together with a reaction assistant.

(17) A technique in which the product obtained in either of the above (11)–(16) is treated with an elementary halogen or a halogen compound or with an aromatic hydrocarbon.

(18) A technique in which a reaction product resulting after the metal oxide, the organomagnesium compound (a-1) and the halogen-containing compound are contacted with each other is caused to contact with the electron donor (a-3) and with, preferably, the titanium compound (a-2).

(19) A technique in which a magnesium compound (a-1), such as a magnesium salt of an organic acid, an alkoxy-magnesium or an aryloxymagnesium, is brought into contact with the titanium compound (a-2), with the electron donor (a-3) and, if necessary, further with a halogen-containing hydrocarbon.

(20) A technique in which a solution of the magnesium compound (a-1) and an alkoxytitanium in a hydrocarbon solvent is brought into contact with the electron donor (a-3) and, if necessary, further with the titanium compound (a-2). In this case, it is favorable that a halogen-containing compound, such as a halogen-containing silicium compound, is caused to co-exist.

(21) A technique in which a liquid magnesium compound (a-1) exhibiting no reducing function is caused to react with an organometallic compound to cause a composite solid product of magnesium/metal (aluminum) to deposit out and, then, the product is reacted with the electron donor (a-3) and with the titanium compound (a-2).

As the organometallic compound catalyst component (b) mentioned above, those which contain a metal selected among the Group I to Group III of the periodic table are preferred. Concretely, there may be exemplified organoaluminum compounds, complex alkyl compounds with Group I metal and aluminum, organometallic compounds of Group II metals and so on, represented by the formulae given below:

An organoaluminum compound (b-1) represented by the formula

In which $R^1$ and $R^2$ represent each a hydrocarbon group having usually 1–15 carbon atoms, preferably 1–4 carbon atoms, which may be identical with or different from each other, X denotes a halogen atom, m is in the range $0<m\leq3$, n is in the range $0\leq n<3$, p is in the range $0\leq p<3$ and q is in the range $0\leq q<3$, wherein $m+n+p+q=3$.

An alkylated complex of a Group I metal and aluminum (b-2) represented by the formula

In the formula, $M^1$ is Li, Na or K and $R^1$ has the same meaning as above.

A dialkylated compound of Group II or Group III metal (b-3) represented by the formula

In the formula, $R^1$ and $R^2$ have the same meanings as above and $M^2$ is Mg, Zn or Cd.

As the organoaluminum compound (b-1), there may be enumerated, for example, those which are represented by the formula

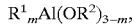

in which $R^1$ and $R^2$ have the same meanings as above and m is preferably of $1.5\leq m\leq3$; those which are represented by the formula

in which $R^1$ has the same meaning as above, X stands for a halogen and m is preferably of $0<m<3$; those which are represented by the formula

in which $R^1$ has the same meaning as above and m is preferably of $2\leq m<3$; and those which are represented by the formula

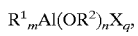

in which $R^1$ and $R^2$ have the same meanings as above, X stands for a halogen, m is in the range $0<m\leq3$, n is in the range $0\leq n<3$ and q is in the range $0\leq q<3$, wherein $m+n+q=3$.

Concrete examples of the organosilicic compound catalyst component (c) include organosilicic compounds represented by the formula (2) given below

 (2)

In the formula (2), n is an integer of 0, 1 or 2, $R^1$ is a radical selected from the group consisting of cyclopentyl, cyclopentenyl, cyclopentadienyl and their derivatives and $R^2$ and $R^3$ denote each a hydrocarbyl radical.

As the concrete examples of $R^1$ in the formula (2), there may be enumerated cyclopentyl and derivatives thereof, such as cyclopentyl, 2-methylcyclopentyl, 3-methylcyclopentyl, 2-ethylcyclopentyl, 3-propylcyclopentyl, 3-isopropylcyclopentyl, 3-butylcyclopentyl, 3-tert-butylcyclopentyl, 2,2-dimethylcyclopentyl, 2,3-dimethylcyclopentyl, 2,5-dimethylcyclopentyl, 2,2,5-trimethylcyclopentyl, 2,3,4,5-tetramethylcyclopentyl, 2,2,5,5-tetramethylcyclopentyl, 1-cyclopentylpropyl and 1-methyl-1-cyclopentylethyl; cyclopentenyl and derivatives thereof, such as cyclopentenyl, 2-cyclopentenyl, 3-cyclopentenyl, 2-methyl-1-cyclopentenyl, 2-methyl-3-cyclopentenyl, 3-methyl-3-cyclopentenyl, 2-ethyl-3-cyclopentenyl, 2,2-dimethyl-3-cyclopentenyl, 2,5-di-methyl-3-cyclopentenyl, 2,3,4,5-tetramethyl-3-cyclopentenyl and 2,2,5,5-tetramethyl-3-cyclopentenyl; cyclopentadienyl and derivatives thereof, such as 1,3-cyclopentadienyl, 2,4-cyclopentadienyl, 1,4-cyclopentadienyl, 2-methyl-1,3-cyclopentadienyl, 2-methyl-2,4-cyclopentadienyl, 3-methyl-2,4-cyclopentadienyl, 2-ethyl-2,4-cyclopentadienyl, 2,2-dimethyl-2,4-cyclopentadienyl, 2,3-dimethyl-2,4-cyclopentadienyl, 2,5-dimethyl-2,4-cyclopentadienyl and 2,3,4,5-tetramethyl-2,4-cyclopentadienyl; derivatives of cyclopentyl, of cyclopentenyl and of cyclopentadienyl, such as indenyl, 2-methylindenyl, 2-ethylindenyl, 2-indenyl, 1-methyl-2-indenyl, 1,3-dimethyl-2-indenyl, indanyl, 2-methylindanyl, 2-indanyl, 1,3-dimethyl-2-indanyl, 4,5,6, 7-tetrahydroindenyl, 4,5,6,7-tetrahydro-2-indenyl, 4,5,6,7-tetrahydro-1-methyl-2-indenyl, 4,5,6,7-tetrahydro-1,3-dimethyl-2-indenyl and fluorenyl.

Concrete examples of the hydrocarbyl groups $R^2$ and $R^3$ in the formula (2) include alkyls, cycloalkyls, aryls and aralkyls. If two or more groups are present for $R^2$ or/and $R^3$, the groups of $R^2$, or/and of $R^3$ may either be identical with or different from each other, wherein $R^2$ may either be identical with or different from $R^3$. The groups $R^1$ and $R^2$ in the formula (2) may be coupled with each other via a bridging group, such as alkylene.

Among the organosilicic compounds represented by the formula (2), preference is given to those in which $R^1$ stands for cyclopentyl, $R^2$ represents an alkyl or cyclopentyl and $R^3$ stands for an alkyl, especially methyl or ethyl.

Concrete examples of the organosilicic compounds represented by the formula (2) include trialkoxysilanes, such as cyclopentyltrimethoxysilane, 2-methylcyclopentyltrimethoxysilane, 2,3-dimethylcyclopentyltrimethoxysilane, 2,5-dimethylcyclopentyltrimethoxysilane, cyclopentyltriethoxysilane, cyclopentenyltrimethoxysilane, 3-cyclopentenyltrimethoxysilane, 2,4-cyclopentadienyltrimethoxysilane, indenyltrimethoxysilane, and fluorenyltrimethoxysilane; dialkoxysilanes, such as dicyclopentyldimethoxysilane, bis(2-methylcyclopentyl) dimethoxysilane, bis(3-tert-butylcyclopentyl) dimethoxysilane, bis(2,3-dimethylcyclopentyl) dimethoxysilane, bis(2,5-dimethylcyclopentyl) dimethoxysilane, dicyclopentyldiethoxysilane, dicyclopentenyldimethoxysilane, di(3-cyclopentenyl) dimethoxysilane, bis(2,5-dimethyl-3-cyclopentenyl) dimethoxysilane, di-2,4-cyclopentadienyldimethoxysilane, bis(2,5-dimethyl-2,4-cyclopentadienyl)dimethoxysilane, bis (1-methyl-1-cyclopentylethyl)dimethoxysilane, cyclopentylcyclopentenyldimethoxysilane, cyclopentylcyclopentadienyldimethoxysilane, diindenyldimethoxysilane, bis(1,3-dimethyl-2-indenyl) dimethoxysilane, cyclopentadienylindenyldimethoxysilane, difluorenyldimethoxysilane, cyclopentylfluorenyldimethoxysilane and indenylfluorenyldimethoxysilane; monoalkoxysilanes, such as tricyclopentylmethoxysilane, tricyclopentenylmethoxysilane, tricyclopentadienylmethoxysilane, tricyclopentylethoxysilane, dicyclopentylmethylmethoxysilane, dicyclopentylethylmethoxysilane, dicyclopentylmethylethoxysilane, cyclopentyldimethylmethoxysilane, cyclopentyldiethylmethoxysilane, cyclopentyldimethylethoxysilane, bis(2,5-dimethylcyclopentyl)cyclopentylmethoxysilane, dicyclopentylcyclopentenylmethoxysilane, dicyclopentylcyclopentadienylmethoxysilane and diindenylcyclopentylmethoxysilane; and others, such as ethylenebiscyclopentyldimethoxysilane.

For polymerizing propylene using a catalyst composed of the solid titanium catalyst component (a), the organometallic compound catalyst component (b) and the organosilicic compound catalyst (c), a prepolymerization may be incorporated. In the prepolymerization, an olefin is polymerized in the presence of a solid titanium catalyst component (a), an organometallic compound catalyst component (b) and, if necessary, an organosilicic compound catalyst component (c).

For the olefin to be pre-polymerized, there may be used, for example, a linear olefin, such as ethylene, propylene, 1-butene, 1-octene, 1-hexadecene or 1-eicosene; or an olefin having branched structure, such as 3-methyl-1-butene, 3-methyl-1-pentene, 3-ethyl-1-pentene, 4-methyl-1-pentene, 4-methyl-1-hexene, 4,4-dimethyl-1- hexene, 4,4-dimethyl-1-pentene, 4-ethyl-1-hexene, 3-ethyl-1-hexene, allylnaphthalene, allylnorbornane, styrene, dimethylstyrenes, vinylnaphthalenes, allyltoluenes, allylbenzene, vinylcyclohexane, vinylcyclopentane, vinylcycloheptane or allyltrialkylsilanes. They may be co-polymerized.

The prepolymerization may favorably be carried out in such a manner that the polymerized product will be formed in an amount of about 0.1–1,000 g, preferably 0.3–500 g per one gram of the solid titanium catalyst component (a). If the pre-polymerized amount is too large, the efficiency for producing the (co)polymer in the inherent polymerization may decrease. In the prepolymerization, the catalyst may be used at a concentration considerably higher than that in the system of the inherent polymerization.

Upon the multistage polymerization of propylene using the catalyst as above, it is permissible to subject propylene to a copolymerization with other comonomer(s) mentioned above in either one stage or in all the stages, so long as the purpose of the present invention is not obstructed.

In the multistage polymerization, propylene is subjected to homo-polymerization or to copolymerization with other comonomer(s) in each stage to produce a polypropylene product, wherein the polypropylene product may preferably have a content of the structural unit of propylene exceeding 90 mole %, preferably in the range of 95–100 mole %. The content of the structural unit of propylene in each stage can be adjusted by, for example, altering the amount of hydrogen supplied to each polymerization system. However, it is preferable to effect the polymerization in the first stage without supplying hydrogen thereto, when a high molecular weight polypropylene is to be produced there.

On the multistage polymerization of propylene, it is permissible to incorporate in the polymerization process a stage of copolymerization of propylene with ethylene in addition to the prulality of polymerization stages mentioned above, in order to form a propylene/ethylene copolymer rubber to produce a propylene block-copolymer.

For the intrinsic polymerization, it is favorable to use the solid titanium catalyst component (a) (or the catalyst for the prepolymerization) in an amount of about 0.0001–50 mmol, preferably about 0.001–10 mmol, calculated as titanium atom, per one liter of the polymerization volume. The organometallic compound catalyst component (b) may favorably be used in an amount of about 1–2,000 moles, preferably about 2–500 moles, as calculated for the atomic weight of the metal per one mole of titanium atom in the polymerization system. The organosilicic compound catalyst component (c) may favorably be used in an amount of about 0.001–50 moles, preferably about 0.01–20 moles, per one mole of the metal atom of the organometallic compound catalyst component (b).

The polymerization may be effected in either of gas phase polymerization or liquid phase polymerization such as solution polymerization and suspension polymerization, wherein each stage may be realized in a different way. It may be performed either in a batchwise, continuous or semi-continuous way. Each of the stages may be performed in a plurality of polymerization reactors, for example, in 2–10 reactors. For industrial production, it is most preferably to carry out the polymerization in continuous way, wherein preference is given to such a practice that the polymerization in the second or the subsequent stage is effected in at least two separate polymerization reactors, whereby gel-formation can be suppressed.

As the polymerization medium, inert hydrocarbon may be used and propylene in liquid state may be used therefor. The polymerization condition may be selected adequately within the ranges for the polymerization temperature of about −50° C. to +200° C., preferably about 20° C. to 100° C., and for the polymerization pressure of normal pressure to 9.8 MPa (normal pressure to 100 kgf/cm² gauge), preferably about 0.2 to 4.9 MPa (about 2 to 50 kgf/cm² gauge).

The first polypropylene resin composition and the second polypropylene resin composition according to the present invention can be used after blending them. It is permissible that each of the first and the second polypropylene resin compositions according to the present invention contains on requirement other polymer(s) and/or additives etc., so long as the purpose of the present invention is not obstructed. As the said other polymers, polypropylenes which are not included in the first and the second polypropylene resin compositions according to the present invention, for example, homopolymer of propylene and propylene/α-olefin copolymers, are enumerated. As others, there may be enumerated, for example, low density polyethylene (LDPE), linear low density polyethylene (LLDPE), high density polyethylene (HDPE), polyolefins, rubber components and engineering plastics. For example, the first or the second polypropylene resin composition according to the present invention may contain, for improving the impact strength, a rubber component, such as an ethylene/α-olefin copolymer rubber or a rubber based on a conjugated diene, in an adequate amount. Concrete examples of such a rubber component include non-crystalline or low-crystalline α-olefin copolymers having no diene component, such as ethylene/propylene copolymer rubber, ethylene/1-butene copolymer rubber, ethylene/1-octene copolymer rubber and propylene/ethylene copolymer rubber; ethylene/propylene/dicyclopentadiene copolymer rubber; ethylene/propylene/non-conjugated diene copolymer rubber, such as ethylene/propylene/1,4-hexadiene copolymer rubber, ethylene/propylene/cyclooctadiene copolymer rubber, ethylene/propylene/methylenenorbornene copolymer rubber and ethylene/propylene/ethylidenenorbornene copolymer rubber; and ethylene/butadiene copolymer rubber.

As the additives, there may be enumerated, for example, nucleating agent, antioxidant, hydrochloric acid absorber, heat stabilizer, anti-weathering agent, light stabilizer, UV-absorber, slipping agent, anti-blocking agent, antifogging agent, lubricating agent, antistatic agent, flame retardant, pigments, colorants, dispersant, copper-sequestering agent, neutralizing agent, foaming agent, plasticizer, bubble preventing agent, cross-linking agent, flowability improving agent such as peroxides, weld strength improving agent, natural petroleum oils, synthetic oils, waxes and inorganic fillers such as talc etc.

The first and the second polypropylene resin compositions according to the present invention may contain the above-mentioned prepolymer, as a nucleating agent, or an inherent nucleating agent chosen among known ones or, further, the above-mentioned prepolymer together with an inherent nucleating agent. By inclusion or addition of a nucleating agent, micronization of the crystal grains and increment of the crystallization velocity are attained, whereby a high speed molding can be realized. For example, when a nucleating agent is contained in the first and the second polypropylene resin compositions according to the present invention, it is possible to provide for a micronization of the crystals together with attainment of increased crystallization velocity to permit high speed molding. For the nucleating agent other than the prepolymer mentioned above, various nucleating agent known previously, such as nucleating agents based on phosphate, sorbitol, metal salts of aromatic or aliphatic carboxylic acids and inorganic substances, may be employed without any restriction.

The first and the second polypropylene resin compositions according to the present invention have a high melt tension (MT) and are superior in the moldability and in the stiffness, so that they can be processed into molded articles of not only small sizes but also large sizes, which have better appearance and are difficultly deformable. Therefore, the first and the second polypropylene resin compositions according to the present invention can be used without any limitation for various application fields where the above-mentioned characteristic properties are required. Thus, they are adapted for use as the starting material of, for example, blow-molded articles, vacuum-formed articles, pressure-formed articles, calendered articles, stretched films, inflation films, extrusion molded articles and foamed articles, while they can be used as the starting material for other molded articles and for other molding techniques.

The resin composition for blow molding according to the present invention is constituted of a resin blend comprising the first and/or the second polypropylene resin composition, other resins including one or more ethylenic polymers including a low density polyethylene (LDPE) and a high density polyethylene (HDPE), an ethylene/α-olefin random copolymer and elastomer(s) based on styrene, fillers and additives. The proportion of the summed-up amount of the first and the second polypropylene resin compositions according to the present invention in the resin composition for blow molding may favorably be in the range of 50–99% by weight, preferably 50–90% by weight. The resin composition for blow molding according to the present invention per se has also a high melt tension (MT) and is superior in the moldability and in the stiffness, so that it can be used favorably as the material to be processed by blow molding, in particular for large-sized articles, such as for example, those in which the weight of the parison is 5 kg or higher.

The blow-molded article according to the present invention is a hollow product prepared by subjecting the first or the second polypropylene resin composition according to the present invention, or the resin composition for blow molding according to the present invention, to a blow molding. For blow molding the first polypropylene resin composition according to the present invention, it is preferable that the first polypropylene resin composition has the following characteristic feature 8), namely, 8) that the relationship between the melt tension (MT), determined by Flow Tester at 230° C., and the critical shearing rate (SRc) meets the following formula (I), preferably the following formula (I'):

$$MT > -4.16 \times Ln(SRc) + 29 \qquad (I)$$

$$MT > -4.16 \times Ln(SRc) + 33 \qquad (I')$$

in which MT represents the melt tension in gram. SRc represents the critical shearing rate in sec$^{-1}$ and Ln indicates the natural logarithm.

The blow-molded article according to the present invention is produced from the polypropylene resin composition according to the present invention having a high melt tension, so that the parison will scarcely suffer from occurrence of draw-down and from occurrence of waving and rough surface even in a large-sized parison. Therefore, blow-molded articles of not only small size but also large size can be obtained easily with better appearance in an efficient manner. For example, a large-sized blow-molded article, such as bumper or spoiler of automobile produced from a parison having a weight of 5 kg or more, can be produced at a high speed efficiently. Due to the superior stiffness, the resulting blow-molded articles are scarcely deformable.

For producing the blow-molded article according to the present invention from the above-mentioned polypropylene resin composition, known blow molding apparatuses can be employed. The molding conditions may also be those known ones.

In the case of extrusion blow molding, a blow-molded article can be obtained by extruding the polypropylene resin composition according to the present invention in a molten state at a resin temperature of, for example, 170 to 300° C., preferably 170 to 270° C., through a die to form a tubular parison and placing this parison in a mold having the shape corresponding to that of the molded article, whereupon air is blown into this parison at a resin temperature of 130 to 300° C., preferably 200 to 270° C., in order to fit it to the mold inner face to obtain the contemplated blow-molded article. The extension magnification may preferably be 1.5- to 5-fold in the lateral direction.

In the case of injection blow molding, the polypropylene resin composition according to the present invention is injected into a mold at a resin temperature of, for example, 170 to 300° C., preferably 170 to 270° C., to form a parison, whereupon the parison is placed in a mold of a shape corresponding to that of the molded article and air is blown into the parison in order to fit it to the mold at a resin temperature of 120 to 300° C., preferably 140 to 270° C., to obtain the blow-molded article. The extension magnification may preferably be 1.1- to 1.8-fold in the longitudinal direction and 1.3- to 2.5-fold in the lateral direction.

In the case of stretching blow molding, the polypropylene resin composition according to the present invention is injected into a mold at a resin temperature of, for example, 170 to 300° C., preferably 170 to 280° C., to form a parison which is then preliminarily blown under a predetermined condition, whereupon this pre-blown parison is subjected to a stretching blow molding at a resin temperature of 80 to 200° C., preferably 100 to 180° C., to obtain the blow-molded article. The extension magnification may preferably be 1.2- to 4.5-fold in the longitudinal direction and 1.2- to 8-fold in the lateral direction.

Concrete examples of the blow-molded article according to the present invention include automobile exterior furnishings, such as spoiler, bumper, side molding, front grill guard and bumper guard; automobile interior furnishings, such as sun visor, radiator tank, washer tank, ducts, distributor, evaporator casing, console box, indicator panel and door trim; vessels, such as kerosene tank, vessels for foods, shampoo cartridge, containers for cosmetics, containers for detergents, vessels for drugs and containers for toner; and others, such as toys and containers. Among them, large-sized blow-molded articles with parison weights of 5 kg and higher, in particular, automobile exterior furnishings, such as bumper and spoiler, may favorably be enumerated.

The vacuum- or pressure-formed article according to the present invention is produced by processing a sheet or film made of the first or the second polypropylene resin composition according to the present invention by vacuum- or pressure forming. Due to the high melt tension of the starting polypropylene resin composition, the sheet or film can sufficiently fit the shape of the mold inner face upon the vacuum- or pressure forming. Therefore, it can be processed by vacuum- or pressure forming at higher speed even in a large-sized article and permits deep drawing while providing superior strength and better appearance.

For producing the vacuum- or pressure-formed article according to the present invention from the polypropylene resin composition according to the present invention, known apparatuses for vacuum-forming or for pressure forming can be used. The forming conditions may also be those known ones. Thus, for example, a formed article in a form of sheet made of the polypropylene resin composition according to the present invention is held on a mold having a shape corresponding to that to be assumed at a temperature of 180–300° C., preferably 180–270° C., more preferably 180–250° C., and, then, by evacuating the mold or by introducing a compressed air into the mold cavity, contemplated vacuum- or pressure-formed article can be obtained.

Concrete examples of the vacuum- or pressure-formed article according to the present invention include automobile interior furnishings, such as roof liner, refrigerator interior articles, laundry machine interior and exterior parts, jerry packages, instant lunch package, trays, trays for foods, foamed trays for foods, package for bean curd, cups, bags, heat resistant trays for electronic oven, protecting cases for machines and packaging cases for merchandizes.

The calendered article according to the present invention is produced by calendering the first or the second polypropylene resin composition according to the present invention. Due to the high melt tension of the starting polypropylene resin composition according to the present invention, sheet or film superior in the strength and gloss exhibiting scarce irregularity of thickness can easily be calendered at high speed.

For producing the calendered article according to the present invention from the polypropylene resin composition, known calendering apparatuses can be employed. The calendering conditions may also be known ones. For example, using a calendering machine of, for example, the series type, L-shaped type, reverse L-shaped type or Z-shaped type, calendering can be effected at a resin temperature of 180–300° C., preferably 180–270° C., and at a heating roll temperature of 170–300° C., preferably 170–270° C. It is also possible to produce an artificial leather, waterproof cloth or various laminates by feeding paper or cloth to the roll upon calendering.

Concrete examples of the calendered article according to the present invention include original sheets for processing into various cards and original sheets for producing household commodities.

The extrusion molded article according to the present invention is produced by extrusion-molding the first or the second polypropylene resin composition according to the present invention. Due to the high melt tension of the starting polypropylene resin composition according to the present invention, it can be subjected to extrusion molding at high speed and can be processed into a large-sized article having a high strength. In the case where the extrusion-molded article according to the present invention is an extruded sheet, the thickness thereof may range usually from 0.3 to 5 mm, preferably from 0.5 to 3 mm.

For producing the extrusion-molded article according to the present invention from the polypropylene resin composition according to the present invention, known extrusion apparatuses can be employed. For example, an extruding machine, such as monoaxial screw extruder, kneader extruder, ram extruder or gear extruder, can be used to produce an extruded sheet. The extruder may be provided with a circular die or a T-die. The conditions of extrusion may also be known ones, while it is preferable to effect the extrusion under the condition such as given below. For example, using an extruder provided with a T-die, a sheet may preferably be extruded at a resin temperature of 180–300° C., preferably 180–270° C., and at a T-die temperature of 180–300° C., preferably 180–290° C. For cooling the extruded article, water can be used, while other means, such as air-knife or cooling roll, may also be employed. It is also possible to produce an artificial leather, waterproof cloth or various laminates by feeding paper or cloth to the roll upon the extrusion.

Concrete examples of the extrusion-molded article according to the present invention include architectural furnishings, such as eaves gutter, curtain rail, window frame, shelves and door; extruded profile articles, such as cable ducts, roller shutters and shutters; and others, such as tubes, pipes, electric cables (sheathed), films, sheets, boards, fiber and tape.

The stretched film according to the present invention is a monoaxially or biaxially stretched film produced by stretching a sheet or film made of the first or the second polypropylene resin composition according to the present invention. Due to the high melt tension of the starting polypropylene resin composition according to the present invention, the resulting stretched film is superior in the thickness accuracy and can be produced at high speed stably without suffering from breaking of the film during the stretching. The stretched film according to the present invention has a thickness of, usually, 5–200 $\mu$m, preferably 10–120 $\mu$m. The stretching magnification ratio of the stretched film according to the present invention for biaxially stretched film is in the range of, usually, 9- to 100-fold, preferably 40- to 70-fold, and that for monoaxially stretched film in the range of, usually, 2- to 10-fold, preferable 2- to 6-fold.

For producing the stretched film according to the present invention from the polypropylene resin composition according to the present invention, known stretching apparatuses can be employed. For example, a tenter (with axial/lateral stretching or lateral/axial stretching), a simultaneous biaxial stretching machine or a monoaxial stretching machine may be exemplified. The conditions of stretching may also be known ones. For example, by melt-extruding the polypropylene resin composition according to the present invention at a temperature of 200–280° C., preferably 240–270° C., and stretching the resulting film up to 2- to 10-fold, preferably 2- to 6-fold in axial direction, a monoaxially stretched film can be produced. In an alternative technique, a biaxially stretched film can be obtained by melt-extruding the polypropylene resin composition according to the present invention at a temperature of 200–280° C., preferably 240–270° C., and stretching the resulting film under an atmosphere of 120–200° C., preferably 130–180° C., up to 3- to 10-fold in axial direction and up to 3- to 10-fold in lateral direction.

Concrete examples of the stretched film according to the present invention include packaging films for foods, such as candy and vegetable; shrinkable films for wrapping cup-noodle etc.; packaging film for packaging textile goods, such as utility shirt, T-shirt and panty stocking; films for office supplies, such as clear file, clear sheet; and others, such as capacitor film, cigarette packaging film, film for instant packaging, decoration film and packaging tape.

The inflation film according to the present invention is produced by subjecting the first or the second polypropylene resin composition according to the present invention to an inflation molding. Due to the high melt tension of the starting polypropylene resin composition according to the present invention, the balloon formed upon the inflation molding is held stable. Therefore, the inflation film according to the present invention exhibits scarce decrease in the strength and in the transparency and is superior in the stiffness and in the transparency, while permitting a high-speed molding, as seen in the film made of a resin blended with a high-pressure low density polyethylene.

For producing the inflation film according to the present invention from the polypropylene resin composition, known inflation-molding apparatuses can be employed. The conditions for the molding may also be those known ones. For example, a condition of a resin temperature of 180–240° C., an air cooling in one or two stages at an air temperature of 10–40° C., a rolling-up velocity of 5–200 m/min. and an inflation ratio of 1.1- to 5-fold may be employed. The inflation film may have a thickness in the range of 10 $\mu$m to 1 mm, preferably 15 $\mu$m to 0.5 mm.

Concrete examples of the inflation film according to the present invention include packaging films for foods, such as candy and vegetable; packaging film for packaging textile goods, such as utility shirt, T-shirt and panty stocking; films for office supplies, such as clear file, clear sheet; and others, such as cleaning bag, films for fashion bags, films for agricultural uses and cup.

The foamed article according to the present invention is produced by causing the first or the second popypropylene resin composition according to the present invention to foam up. To the technique for effecting the foaming, no special limitation is imposed and known techniques, such as foaming under normal pressure, extrusion foaming, pressure foaming, injection foaming and beads forming, can be employed. Due to the high melt tension of the starting polypropylene resin composition according to the present invention, foaming can be effected at a high foaming-up ratio in a uniform cell texture even for a large-sized foamed article. The foamed article according to the present invention can be produced by heating a foamable composite composed of the polypropylene resin composition according to the present invention, foaming agent (propellant) and, on requirement, foaming nucleating agent, organic peroxide, cross linking assistant and so on.

As the foaming agent, chemicals which exist as liquid or solid at normal temperature and develop a gas by heating can be used. Concretely, there may be employed, for example, azodicarbonamide, barium azodicarboxylate, N,N'-dinitrosopentamethylenetetramine, 4,4-oxybis (benzenesulfonylhydrazide), diphenylsulfon-3,3-disulfonylhydrazide, p-toluenesulfonyl semicarbazide, trihydrazinotriazine, biurea and zinc carbonate. Among them, preference is given to compounds which develop a large amount of gas and has a gas development cease temperature sufficiently lower than the starting temperature of thermal deterioration of the polypropylene resin composition, for example, azodicarbonamide, N,N'-dinitrosopentamethylenetetramine and trihydrazinotriazine. These foaming agents may preferably be present in the polypropylene resin composition in a proportion of, favorably, 1–20 parts by weight, preferably 2–5 parts by weight, per 100 parts by weight of the polypropylene resin composition.

Foaming agents other than the above may also be employed, for example, gases existing in gas phase at normal temperature and normal pressure, such as carbon dioxide, nitrogen, argon, helium, propane, butane, chlorofluorocarbons (flons), methane, ethane, oxygen and air; low boiling volatile foaming agents (low boiling organic solvents), such as n-pentane, iso-pentane, n-hexane, n-heptane, n-octane, cyclopentane, cyclohexane, methanol, ethanol, 1-butanole, 3-pentanol, acetone, methyl ethyl ketone and diethyl ether. Among them, preference is given to carbon dioxide and nitrogen.

The nucleating agent for the foaming is used to control the diameter and number of gas bubbles of the foamed article. Concrete examples of the foaming nucleating agent include talc, sodium bicarbonate, citric acid, calcium carbonate and ammonium carbonate.

The organic peroxide mentioned above is used for attaining cross-linking of the foamed product. As the organic peroxide, there may be employed in most cases organic peroxides and organic peroxyesters. Concrete examples therefor include the following compounds:

3,5,5-trimethylhexanoyl peroxide, octanoyl peroxide, decanoyl peroxide, lauroyl peroxide, succinic acid peroxide, acetyl peroxide, tert-butyl peroxy(2-ethyl hexanoate), m-toluoyl peroxide, benzoyl peroxide, tert-butyl peroxyisobutyrate, 1,1-bis(tert-butylperoxy)-3,5,5-trimethylcyclohexane, 1,1-bis(tert-butylperoxy) cyclohexane, tert-butyl peroxymaleate, tert-butylperoxylaurate, tert-butylperoxy-3,5,5-trimethylcyclohexanoate, cyclohexanone peroxide, tert-butylperoxyisopropyl carbonate, 2,5-dimethyl-2,5-di (benzoylperoxy)hexane, tert-butylperoxyacetate, 2,2-bis (tert-butylperoxy)butane, tert-butylperoxybenzoate, n-butyl-4,4-bis(tert-butylperoxy)valerate, di-tert-butylperoxyisophthalate, methyl ethyl ketone peroxide, α,α'-bis(tert-butylperoxyisopropyl)benzene, dicumyl peroxide, 2,5-dimethyl-2,5-di(tert-butylperoxy)hexane, tert-butylcumyl peroxide, diisopropylbenzene hydroperoxide, di-tert-butyl peroxide, p-menthane hydroperoxide, 2,5-dimethyl-2,5-di(tert-butylperoxy)-3-hexyne, 1,1,3,3-tetramethylbutyl hydroperoxide, 2,5-dimethylhexane-2,5-dihydroperoxide, cumene hydroperoxide and tert-butylhydroxy peroxide.

Among them, preference is given to 1,1-bis(tert-butylperoxy)cyclohexane, tert-butylperoxy maleate, tert-butylperoxy laurate, tert-butylperoxy-3,5,5-trimethyl cyclohexanoate, cyclohexanone peroxide, tert-butylperoxyisopropyl carbonate, 2,5-dimethyl-2,5-di (benzoylperoxy)hexane, tert-butylperoxy acetate, 2,2-bis (tert-butylperoxy)butane, tert-butylperoxy benzoate, n-butyl-4,4-bis(tert-butylperoxy) valerate, di-tert-butylperoxy isophthalate, methyl ethyl ketone peroxide, α,α'-bis(tert-butylperoxyisopropyl)benzene, dicumyl peroxide, 2,5-dimethyl-2,5-di(tert-butylperoxy)hexane, tert-butylcumyl peroxide, diisopropylbenzene hydroperoxide, di-tert-butyl peroxide, p-menthane hydroperoxide, 2,5-dimethyl-2,5-di(tert-butylperoxy)-3-hexyne, 1,1,3,3-tetramethylbutyl hydroperoxide, 2,5-dimethylhexane-2,5-dihydro peroxide, cumene hydroperoxide and tert-butylhydroxy peroxide. The organic peroxide may favorably be used in an amount of 0.01–5 parts by weight, preferably 0.01–1 part by weight, per 100 parts by weight of the polypropylene resin composition.

The cross linking assistant functions such that a hydrogen atom in the polypropylene is drawn out by the organic peroxide and the thereby produced polymer radical will react with the cross linking assistant before it comes to cleavage to thereby stabilize the polymer radical and, at the same time, to increase the cross linking efficiency. As the cross linking assistant functioning as above, there may be used usually unsaturated compounds having one or two or more double bonds, oximes, nitroso compounds and maleimides each solely or in a combination of two or more of them.

As the crosslinking assistant, there may be enumerated concretely, for example, divinyl compounds, such as divinylbenzene and diallyl phthalate; polyfunctional methacrylates and acrylates, such as 1,6-hexanediol dimethacrylate, ethyleneglycol dimethacrylate, trimethylolpropane trimethacrylate, pentaerythritol triacrylate and neopentylglycol diacrylate; cyanurates and isocyanurates, such as triallyl cyanurate and triallyl isocyanurate; oximes, such as quinone dioxime and benzoquinone dioxime; nitroso compounds, such as p-nitrosophenol and the like; and maleimides, such as N,N-methaphenylenebismaleimide and so on. Among them, preference is given to 1,6-hexanediol dimethacrylate and neopentylglycol diacrylate.

The foamed article according to the present invention may have any shape. It may be present in a form of, for example, block, sheet and monofilament. For producing the foamed article according to the present invention using the polypropylene resin composition according to the present invention, known foam-molding apparatus can be used. The molding conditions may also be known ones.

For example, a foamed article in a form of sheet can be obtained by blending the polypropylene resin composition according to the present invention, a foaming agent which is present in liquid or solid state at normal temperature and which develops a gas by heating, an organic peroxide, a cross linking assistant and, if necessary, a heat stabilizer on a mixing apparatus, such as Henschel mixer, V-blender, ribbon blender or tumbler blender, kneading the resulting blend using an extruder, preferably that provided with a gas bent, while heating it at a temperature at which the organic peroxide will be decomposed but not the foaming agent and while removing the unnecessary volatile substances via the bent which is disposed at a portion downstream the high temperature heating zone and extruding the molten blend through a T-die or a circular die arranged on the extruder to thereby obtain a foamable sheet which contains the foaming agent in substantially undecomposed state and which has been subjected to cross linking. This foamable sheet is then brought into foaming by a known foaming technique, for example, press foaming in which the foaming agent is decomposed under a pressurized condition, a heat foaming in a molten salt bath in which the foaming agent is decomposed by heating under normal pressure, heat foaming in a hot blast oven, heat foaming by thermal radiant ray, heat foaming by microwave or combination of these techniques, to obtain a foamed article.

In an alternative method for producing a foamed article, a substantially foamed sheet can be obtained by blending the polypropylene resin composition according to the present invention, a foaming agent which is present in liquid or solid state at normal temperature and which develops a gas by heating and, if necessary, a heat stabilizer and so on, on a mixing apparatus, such as Henschel mixer, V-blender, ribbon blender or a tumbler blender, kneading the resulting blend using an extruder, while heating it at a temperature at which the foaming agent will be decomposed, and extruding the molten blend through a T-die or a circular die arranged on the extruder.

In a further alternative method for producing a foamed article, a foamed sheet can be produced by blending the polypropylene resin composition according to the present invention, a foaming nucleating agent and, if necessary, a heat stabilizer and so on, on a mixing apparatus, such as Henschel mixer, V-blender, ribbon blender or a tumbler blender, kneading the resulting blend using an extruder, while supplying continuously thereto a gas which is present at normal temperature and normal pressure in gas phase or a low boiling volatile foaming agent (low boiling organic solvent) via a nucleating agent feed nozzle disposed midway in the extruder cylinder and extruding the kneaded mass through a T-die or a circular die arranged on the extruder into a substantially foamed sheet.

By the method for producing the foamed article using a gas which exists in gas phase at normal temperature and normal pressure or a low boiling volatile foaming agent as described above, a foamed sheet having a fine foam cell structure of high foaming magnification ratio of, for example, at least 2-fold, with an average foam cell diameter of about 100 μm can be obtained. When a conventional polypropylene resin or a polypropylene resin composition other than the polypropylene resin composition according to the present invention is used as the starting resin, it is difficult to obtain a foamed sheet of a high foaming magnification ratio. Thus, for example, it is difficult to obtain a foamed sheet having a foaming magnification ratio of at least 2-fold and a fine foam cell structure with an average foam cell diameter of about 100 μm.

In a further alternative method for producing a foamed article, the polypropylene resin composition according to the present invention and, on requirement, heat stabilizer and so on are kneaded on a mixing apparatus, such as Henschel mixer, V-blender, ribbon blender or a tumbler blender, and the resulting blend is kneaded using an extruder to obtain a pelletized product. This pelletized product and a low boiling volatile foaming agent (low boiling organic solvent) are treated in a high-pressure vessel at a high temperature to obtain impregnated beads. The resulting impregnated beads are heated by hot steam to cause a preliminary foaming in order to adjust the diameter of the prefoamed cell, whereupon the so treated beads are transferred to a ripening process step for restoring the internal pressure of the beads to normal pressure and are contacted with air sufficiently. The resulting ripened beads are then heated in a mold by, for example, hot steam, to cause final foaming to obtain foamed article.

Concrete examples of the foamed article according to the present invention include office supplies, such as file cases; automobile inertia furnishings, such as roof liner and so on; and others, such as trays, trays for food products, cups for noodles, lunch boxes, containers for fast foods, containers for retorts, vessels for frozen foods, vessels for cooked foods, heat resistant vessels for electronic oven, cups, synthetic timber, original rolled product of various foamed sheets, shock absorbers, heat insulators, sound insulators and vibration damping material.

For molding formed articles, such as blow-molded articles, vacuum- or pressure formings, calendered articles, extrusion-molded articles, stretched films, inflation films and various foamed articles using the first or the second polypropylene resin composition according to the present invention, the starting polypropylene resin composition may favorably contain at least one stabilizer among phenolic stabilizer, organophosphite stabilizer, thioether stabilizer, hindered amine stabilizer and higher fatty acid metal salts. Such additives may favorably be used each in an amount of 0.005–5 parts by weight, preferably 0.01–0.5 part by weight per 100 parts by weight of the polypropylene resin composition according to the present invention.

As described above, the first polypropylene resin composition according to the present invention has, due to the material properties specified, a high melt tension and are superior in the moldability and can afford to process into formed articles which have better appearance and high stiffness and which are scarcely subject to deformation, even for large-sized articles, efficiently at high speed.

The second polypropylene resin composition according to the present invention has, due to the material properties specified, a high melt tension and are superior in the moldability and can afford to process into formed articles which have better appearance and high stiffness and which are scarcely subject to deformation, even for large-sized articles, efficiently at high speed.

By the process for producing the polypropylene resin composition according to the present invention, the polypropylene resin composition described above can be produced in a simple and efficient manner at a low cost, based on the fact that, in the first polymerization stage, a high molecular weight polypropylene product having an intrinsic viscosity [η] of 8–13 dl/g is produced up to a definite yield and, in the second and subsequent polymerization stages, polymerization of propylene is effected in such a way that a polypropylene product having an intrinsic viscosity [η] of lower than 8 dl/g is produced and the melt flow rate (MFR) of the finally obtained polypropylene resin composition as a whole will be in the range of 0.01–5 g/10 min.

The resin composition for blow molding according to the present invention can afford to process into blow-molded articles which have a better appearance and are scarcely subject to deformation even for large-sized articles, in an efficient manner at high speed, since it contains the first or the second polypropylene resin composition described above.

The blow-molded article according to the present invention is obtained by blow-molding the above-mentioned resin composition and, therefore, the parison will scarcely suffer from occurrence of draw-down, so that the blow-molded article is obtained efficiently at high speed and, in addition, is better in the appearance and difficultly deformable.

The vacuum- or pressure-formed article according to the present invention is produced by a vacuum- or pressure forming of the polypropylene resin composition described above, so that it may be permitted to be produced as a large-sized article in a high-speed production and to be processed by deep drawing and, in addition, it is superior in the stiffness and in the appearance.

The calendered article according to the present invention is produced by subjecting the polypropylene resin composition described above to a calendering, so that it may be permitted to be produced as a large-sized article and by high speed calendering and, in addition, it has scarce thickness irregularity and is superior in the gloss, in the appearance and in the stiffness.

The extruded article according to the present invention is produced by subjecting the polypropylene resin composition described above to an extrusion molding, so that it may be permitted to be produced as a large-sized article and in a high speed molding and, in addition, it is superior in the appearance and in the stiffness.

The stretched film according to the present invention is produced by subjecting a sheet or film made of the polypropylene resin composition described above to stretching, so that it may be permitted to be produced as a large-sized article and in a high speed stretching and, in addition, it can be obtained by a stable stretching without suffering from breaking of the film during the stretching and is also superior in the thickness accuracy.

The inflation film according to the present invention is produced by subjecting the polypropylene resin composition described above to an inflation molding, so that it may be permitted to be produced as a large-sized article and by a high speed molding and, in addition, it is obtained from a baloon held in a stable state and, therefore, is superior in the appearance and also in the stiffness and transparency.

Due to the fact that the foamed article according to the present invention is produced by subjecting the polypropylene resin composition described above to foaming, it may be permitted to be produced as a large-sized article and by a high speed molding and, in addition, it may be present as a foamed article having a fine and uniform foam cell structure of high foaming magnification ratio.

THE BEST MODE FOR EMBODYING THE INVENTION

Below, the present invention will be described by way of Examples.

<<Preparation of the Solid Titanium Catalyst Component>>

Production Example 1

-1) Solid Titanium Catalyst Component-1

A vibration mill was employed which is equipped with four crusher pots each having an inner volume of 4 liters and containing therein 9 kg of steel balls of 12 mm diameter. Each pot was charged with 300 g of anhydrous magnesium chloride, 115 ml of diisobutyl phthalate and 60 ml of titanium tetrachloride under a nitrogen atmosphere and the contents were crushed for 40 hours. 5 grams of the resulting co-crushed mass were placed in a 200 ml flask, whereto 100 ml of toluene were added and the mixture was agitated at 114° C. for 30 minutes, whereupon the mixture was stood still and the supernatant was removed. Then, the residue was washed with each 100 ml of n-heptane at 20 ° C. Washing was repeated three times. Then, the washed solids were dispersed in 100 ml of n-heptane to obtain a slurry of solid titanium catalyst component-1. The resulting solid titanium catalyst component-1 contained 2.0% by weight of titanium and 18% by weight of diisobutyl phthalate.

Production Example 2

-2) Solid Titanium Catalyst Component-2

4.8 kg of anhydrous magnesium chloride, 25.0 liters of decane and 23.4 liters of 2-ethylhexyl alcohol were charged in a 200 liter autoclave and were heated and reacted at 130° C. for 2 hours to convert them to a homogeneous solution. To this solution were then added 11.1 kg of phthalic anhydride and the mixture was agitated at 130° C. for further one hour to dissolve the phthalic anhydride so as to obtain a homogeneous solution. The resulting homogeneous solution was cooled down to room temperature, whereupon all of this homogeneous solution was added dropwise to 200 liters of titanium tetrachloride maintained at –20° C. over a period of one hour. After the addition was over, the temperature of the resulting mixed liquid was elevated to 110° C. over a period of 4 hours. On reaching the temperature of 110° C., 2.7 liters of diisobutyl phthalate were added thereto and the mixture was agitated for subsequent two hours while maintaining this temperature. After this 2 hours' reaction, the mixture was hot filtrated to collect the solid matter, which was washed with hexane at 110° C. The washing was effected until the concentration of free titanium compound in the washed liquor will be 0.1 mmol/l or lower. By the procedures as above, solid titanium catalyst component-2 was obtained.

Production Example 3

An autoclave having an inner volume of 200 liters was charged with 250 g of the solid titanium catalyst component-1 obtained in Production Example 1, 32.1 g of triethylaluminum (which is denoted sometimes in the following as TEA) and 125 liters of heptane. Then, thereto were charged 1250 g of propylene while maintaining the internal temperature at 10° C. and the mixture was agitated for 30 minutes, whereupon 18 g of titanium tetrachloride were added thereto, whereby prepolymerization catalyst component-3 in a form of slurry was obtained.

Production Example 4

To 18 liters of hexane, 2,700 mmol of triethylaluminum, 540 mmol of diphenyldimethoxysilane (in the following, sometimed denoted as DPDMS) and 270 mmol, calculated as titanium atom, of the solid titanium catalyst component-2 obtained in the above Production Example 2 were added at 25° C. Thereto were added then 920 N liters of propylene gas over a period of 1.5 hours to obtain prepolymerization catalyst component-4 in a form of slurry.

EXAMPLE 1-1

A polymerization reactor having an internal volume of 3,000 liters was charged under a nitrogen atmosphere with 1180 liters of heptane, 137 grams of diluted triethylaluminum, 279 grams of dicyclopentyldimethoxysilane (in the following, sometimes abbreviated as DCPMS) and 72 grams of the solid titanium catalyst component-1 obtained in Production Example 1. After the nitrogen gas in the polymerization reactor was exhausted using a vacuum pump, the vessel was charged with propylene, whereupon the temperature of the vessel was started to elevate. At 60° C., propylene was supplied thereto continuously so as to maintain the internal pressure of the polymerization reactor at 0.64 MPa (6.5 kgf/cm² gauge) and the polymerization was continued for 2.2 hours under a condition of substantial absence of hydrogen (the first stage polymerization was over). By sampling and analyzing a part of the slurry in the polymerization reactor after the completion of the first stage polymerization, an intrinsic viscosity [η] of 8.7 dl/g was observed.

Then, the temperature was elevated to 70° C. and propylene and hydrogen were supplied so as to maintain the internal pressure at 0.12 MPa (1.2 kgf/cm², gauge) and the hydrogen concentration in the gas phase at 5.1 vol. %, whereupon the polymerization was continued for 4 hours (the second stage polymerization was over). After the polymerization was over, 144.3 ml of methanol were added to the reactor to terminate the polymerization, followed by an ordinary procedure of purification and drying, whereby 690 kg of a powdery polypropylene resin composition were obtained. The polypropylene resin composition finally obtained in this way had, as a whole, a melt flow rate of 0.5 g/10 min. The proportion of the polypropylene product produced by the first stage polymerization relative to the finally obtained polypropylene resin composition, as calculated from the material balance, was 30% by weight. Material properties of the finally obtained polypropylene resin composition X-1 were assessed. The polymerization condition and the results of assessments are given in Table 1 and Table 8, respectively.

EXAMPLE 1-2

In an autoclave having an internal volume of 600 liters, 200 liters of propylene were charged and the temperature thereof was elevated to 60 °C., whereto were added then 0.3 mmol of triethylaluminum. 0.13 mmol of DCPMS and 0.6 mmol, calculated as titanium atom, of the solid titanium catalyst component-2 obtained in Production Example 2. The temperature was elevated to 70° C. and the polymerization was caused while maintaining this temperature for 20 minutes (the first stage polymerization was over).

Then, after the temperature was elevated to 70° C. under a hydrogen partial pressure of 0.05 MPa (0.5 kgf/cm$^2$, gauge), this was maintained for 35 minutes to effect polymerization. Then, the venting valve was caused to open so as to purge the unreacted propylene via an integrating flow meter (the second stage polymerization was over). In order to assess the intrinsic viscosity [η] of the resulting polypropylene product obtained in the first stage polymerization, a part of it was sampled and assessed after the first stage polymerization was over, whereby the intrinsic viscosity [η] was found to be 11 dl/g. The proportion of the polypropylene product produced by the first stage polymerization relative to the amount of the finally obtained polypropylene resin composition was found to be 32% by weight. Material properties of the finally obtained polypropylene resin composition X-2 were assessed. The polymerization condition and the results of assessments are given in Table 3 and Table 8, respectively.

EXAMPLE 1-3

The procedures of Example 1-1 were pursued except that the internal pressure of the polymerization reactor of the second stage was changed to 0.098 MPa (1.0 kgf/cm$^2$, gauge) and the hydrogen concentration in the gas phase to 14 vol. %, whereby polypropylene resin composition X-3 was obtained. The polymerization condition and the results of assessments are given in Table 1 and Table 8, respectively.

EXAMPLE 1-4

A polymerization reactor-1 having an internal volume of 500 liters was supplied continuously with 87 liters/hr of heptane, 9.6 grams/hr of the prepolymerization catalyst component-3 obtained in Production Example 3, 18.2 grams/hr of triethylaluminum and 37.2 grams/hr of DCPMS, while supplying thereto propylene continuously at 60° C. under a condition of substantial absence of hydrogen so as to maintain the internal pressure of the polymerization reactor-1 at 0.69 MPa (7.0 kgf/cm$^2$, gauge) (the first stage polymerization). By sampling the slurry in the polymerization reactor-1 and assessing the intrinsic viscosity [η] of the polypropylene product, a value of 9.1 dl/g was obtained.

The so-obtained slurry was transferred continuously to a polymerization reactor-2 having an internal volume of 500 liters to cause further polymerization. The polymerization reactor-2 was supplied with 32 liters/hr of heptane, while supplying thereto propylene and hydrogen continuously at 70° C. so as to maintain the internal pressure of the polymerization reactor-2 at 0.69 MPa (7.0 kgf/cm$^2$, gauge) and the hydrogen gas concentration in the gas phase at 6% by volume (second stage polymerization).

The slurry discharged out of the polymerization reactor-2 was treated in usual manner, after separation of unreacted monomer, by centrifugation to remove heptane and drying at 80° C. under a pressure of 9,300 Pa (70 mm Hg, gauge) for 10 hours to obtain a product. This powdery product was obtained at a through-put of 80 kg/hr. The melt flow rate of this product was found to be 0.5 g/10 min. The proportion of the polypropylene product produced by the first stage polymerization relative to the amount of the finally obtained polypropylene resin composition as calculated from the material balance was found to be 30% by weight. Material properties of the finally obtained polypropylene resin composition X-4 were assessed. The polymerization condition and the results of assessments are given in Table 4 and Table 8, respectively.

EXAMPLE 1-5

The polymerization was carried out in the same manner as in Example 1-4 except that the supply rates of the prepolymerization catalyst component-3, triethylaluminum and DCPMS supplied to the polymerization reactor-1 were changed to 7.4 g/hr, 13.5 g/hr and 28.7 g/hr, respectively, and the feed rate of heptane supplied to the polymerization reactor-2, the internal pressure and the hydrogen concentration in the gas phase were changed to 40 liters/hr, 0.59 MPa (6.0 kgf/cm$^2$, gauge) and 23 vol. %, respectively, whereby polypropylene resin composition X-5 was obtained. The reaction condition and the results of assessments are given in Tables 4 and 8, respectively.

EXAMPLE 1-6

The polymerization was carried out in a continuous two-stage process by using one reactor in the first stage polymerization and two reactors in the second stage polymerization. Thus, 151 liters/hr of heptane, 8.9 g/hr of the prepolymerization catalyst component-3 obtained in Production Example 3, 16.9 g/hr of triethylaluminum and 34.5 g/hr of DCPMS were supplied continuously to polymerization reactor-1 having an internal volume of 500 liters and thereto was supplied propylene continuously at a temperature of 55° C. under a condition of substantial absence of hydrogen, so as to maintain the internal pressure of the reactor-1 at 0.78 MPa (8.0 kgf/cm$^2$, gauge) (the first stage polymerization). By sampling the slurry in the reactor-1 and assessing the intrinsic viscosity [η] of the polypropylene product, a value of 9.2 dl/g was obtained.

The second stage polymerization was carried out in a continuous process using two polymerization reactors. Thus, the slurry in the polymerization reactor-1 which had been subjected to the first stage polymerization was transferred first to polymerization reactor-2 having an internal volume of 500 liters continuously to subject it to a further polymerization. The polymerization reactor-2 was supplied continuously with heptane at a rate of 14.7 liters/hr, while supplying thereto propylene and hydrogen continuously at a temperature of 70° C. so as to maintain the internal pressure of the polymerization reactor-2 at 0.78 MPa (8.0 kgf/cm$^2$, gauge) and the hydrogen concentration in the gas phase at 6 vol. %. The slurry in the polymerization reactor-2 was then transferred continuously to polymerization reactor-3 having an internal volume of 300 liters to subject it to a further polymerization. The polymerization reactor-3 was supplied continuously with heptane at a rate of 16.4 liters/hr, while supplying thereto propylene and hydrogen continuously at a temperature of 70° C. so as to maintain the internal pressure of the polymerization reactor-3 at 0.74 MPa (7.5 kgf/cm$^2$, gauge) and the hydrogen concentration in the gas phase at 6 vol. %.

The slurry discharged from the polymerization reactor-3 was treated in usual manner, after separation of unreacted monomer, by centrifugation to remove heptane and drying at 80° C. under a pressure of 9,300 Pa (70 mm Hg, gauge) for 10 hours to obtain a product. This powdery product was obtained at a through-put of 80 kg/hr. The melt flow rate of this product was found to be 0.4 g/10 min. The proportion of the polypropylene product produced by the first stage polymerization relative to the amount of the finally obtained polypropylene resin composition as calculated from the material balance was found to be 33% by weight. Material properties of the finally obtained polypropylene resin composition X-6 were assessed. The reaction condition and the results of assessments are given in Table 4 and Table 9, respectively.

EXAMPLE-1-7

The polymerization was carried out in a continuous two-stage process by using one reactor in the first stage polymerization and four reactors in the second stage polymerization. Thus, 53 liters/hr of heptane, 8.0 g/hr of the prepolymerization catalyst component-3 obtained in Production Example 3, 15.2 g/hr of triethylaluminum and 31 g/hr of DCPMS were supplied to polymerization reactor-1 having an internal volume of 500 liters and thereto was supplied propylene continuously at a temperature of 60° C. under a condition of substantial absence of hydrogen, so as to maintain the internal pressure of the reactor-1 at 0.76 MPa (7.8 kgf/cm$^2$, gauge) (the first stage polymerization). By sampling the slurry in the reactor-1 and assessing the intrinsic viscosity [η] of the polypropylene product, a value of 9.5 dl/g was obtained.

The second stage polymerization was carried out in a continuous process using four polymerization reactors. Thus, the slurry in the polymerization reactor-1 which had been subjected to the first stage polymerization was transferred first to polymerization reactor-2 having an internal volume of 500 liters continuously to subject it to a further polymerization. The polymerization reactor-2 was supplied continuously with heptane at a rate of 56 liters/hr, while supplying thereto propylene and hydrogen continuously at a temperature of 70° C. so as to maintain the internal pressure of the polymerization reactor-2 at 0.21 MPa (2.1 kgf/cm$^2$, gauge) and the hydrogen concentration in the gas phase at 6 vol. %. The slurry in the polymerization reactor-2 was then transferred continuously to polymerization reactor-3 having an internal volume of 500 liters to subject it to a further polymerization. The polymerization reactor-3 was supplied continuously with heptane at a rate of 24 liters/hr, while supplying thereto propylene and hydrogen continuously at a temperature of 70° C. so as to maintain the internal pressure of the polymerization reactor-3 at 0.15 MPa (1.5 kgf/cm$^2$, gauge) and the hydrogen concentration in the gas phase at 6 vol. %. The slurry in the polymerization reactor-3 was then transferred continuously to polymerization reactor-4 having an internal volume of 500 liters to subject it to a further polymerization. The polymerization reactor-4 was supplied continuously with heptane at a rate of 17 liters/hr, while supplying thereto propylene and hydrogen continuously at a temperature of 70° C. so as to maintain the internal pressure of the polymerization reactor-4 at 0.098 MPa (1.0 kgf/cm$^2$, gauge) and the hydrogen concentration in the gas phase at 6 vol. %. The slurry in the polymerization reactor-4 was then transferred continuously to polymerization reactor-5 having an internal volume of 300 liters to subject it to a further polymerization. The polymerization reactor-5 was supplied continuously with heptane at a rate of 10 liters/hr, while supplying thereto propylene and hydrogen continuously at a temperature of 70° C. so as to maintain the internal pressure of the polymerization reactor-5 at 0.020 MPa (0.20 kgf/cm$^2$, gauge) and the hydrogen concentration in the gas phase at 6 vol. %.

The slurry discharged from the polymerization reactor-5 was treated in usual manner, after separation of unreacted monomer, by centrifugation to remove heptane and drying at 80° C. under a pressure of 9,300 Pa (70 mm Hg, gauge) for 10 hours to obtain a product. This powdery product was obtained at a through-put of 78 kg/hr. The melt flow rate of this product was found to be 0.5 g/10 min. The proportion of the polypropylene product produced by the first stage polymerization relative to the amount of the finally obtained polypropylene resin composition as calculated from the material balance was found to be 32% by weight. Material properties of the finally obtained polypropylene resin composition X-7 were assessed. The reaction condition and the results of assessments are given in Table 4 and Table 9, respectively.

EXAMPLE 1-8

The polymerization was carried out in the same manner as in Example 1-7 except that, in the first place, the supply rates of the prepolymerization catalyst component-3, triethylaluminum and DCPMS supplied to the polymerization reactor-1 were changed to 5.4 g/hr, 10.3 g/hr and 20.9 g/hr, respectively, in the second place, the feed rate of heptane supplied to the polymerization reactor-2, the internal pressure and the hydrogen concentration in the gas phase were changed to 70 liters/hr, 0.61 MPa (6.2 kgf/cm$^2$, gauge) and 30 vol. %, respectively, in the third place, the feed rate of heptane supplied to the polymerization reactor-3 and the internal pressure were changed to 10 liters/hr and 0.47 MPa (4.8 kgf/cm$^2$, gauge), respectively, in the fourth place, the feed rate of heptane supplied to the polymerization reactor-4, the internal pressure and the hydrogen concentration in the gas phase were changed to 15 liters/hr, 0.52 MPa (5.3 kgf/cm$^2$, gauge) and 30 vol. %, respectively, and in the fifth place, the feed rate of heptane supplied to the polymerization reactor-5, the internal pressure and the hydrogen concentration in the gas phase were changed to 10 liters/hr, 0.32 MPa (3.3 kgf/cm$^2$, gauge) and 30 vol. %, respectively, whereby polypropylene resin composition X-8 was obtained. The reaction condition and the results of assessments are given in Tables 5 and 9, respectively.

EXAMPLE 1-9

The polymerization was carried out as in Example 1-1 except that the internal pressure and the polymerization duration in the reactor of the first stage polymerization were changed to 0.49 MPa (5.0 kgf/cm$^2$, gauge) and 3.0 hours, respectively, and the internal pressure of the polymerization reactor and the hydrogen concentration in the gas phase in the second stage polymerization were changed to 0.20 MPa (2.0 kgf/cm$^2$, gauge) and 25 vol. %, respectively, whereby polypropylene resin composition X-9 was obtained. The reaction condition and the results of assessments are given in Table 1 and Table 9, respectively.

EXAMPLE 1-10

The polymerization was carried out as in Example 1-2 except that the polymerization temperature and the polymerization duration in the first stage polymerization were changed to 70° C. and 25 minutes, respectively, and the polymerization temperature, polymerization duration and the hydrogen partial pressure in the second stage polymerization were changed to 70° C., 35 minutes and 0.07 MPa (0.7 kgf/cm$^2$, gauge), respectively, whereby polypropylene resin composition X-10 was obtained. The reaction condition and the results of assessments are given in Table 3 and Table 9, respectively.

EXAMPLE 1-11

The polymerization was carried out as in Example 1-1 except that the internal pressure of the polymerization reactor and the polymerization duration in the first stage polymerization were changed to 0.49 MPa (5.0 kgf/cm², gauge) and 1.5 hours, respectively, and the internal pressure of the polymerization reactor, the hydrogen concentration in the gas phase and the polymerization duration in the second stage polymerization were changed to 0.18 MPa (1.8 kgf/cm², gauge), 0.7 vol. % and 5.0 hours, respectively, whereby polypropylene resin composition X-11 was obtained. The reaction condition and the results of assessments are given in Table 1 and Table 10, respectively.

EXAMPLE 1-12

The polymerization was carried out as in Example 1-1 except that the internal pressure of the polymerization reactor and the polymerization duration in the first stage polymerization were changed to 0.49 MPa (5.0 kgf/cm², gauge) and 1.5 hours, respectively, and the internal pressure of the polymerization reactor, the hydrogen concentration in the gas phase and the polymerization duration in the second stage polymerization were changed to 0.13 MPa (1.3 kgf/cm², gauge), 19 vol. % and 5.0 hours, respectively, whereby polypropylene resin composition X-12 was obtained. The reaction condition and the results of assessments are given in Table 1 and Table 10, respectively.

EXAMPLE 1-13

The polymerization was carried out as in Example 1-1 except that the internal pressure of the polymerization reactor and the polymerization duration in the first stage polymerization were changed to 0.49 MPa (5.0 kgf/cm², gauge) and 1.8 hours, respectively, and the internal pressure of the polymerization reactor, the hydrogen concentration in the gas phase and the polymerization duration in the second stage polymerization were changed to 0.26 MPa (2.7 kgf/cm², gauge), 29 vol. % and 3.8 hours, respectively, whereby polypropylene resin composition X-13 was obtained. The reaction condition and the results of assessments are given in Table 1 and Table 10, respectively.

EXAMPLE 1-14

The polymerization was carried out as in Example 1-1 except that the internal pressure of the polymerization reactor and the polymerization duration in the first stage polymerization were changed to 0.49 MPa (5.0 kgf/cm², gauge) and 2.0 hours, respectively, and the internal pressure of the polymerization reactor, the hydrogen concentration in the gas phase and the polymerization duration in the second stage polymerization were changed to 0.24 MPa (2.4 kgf/cm², gauge), 0.2 vol. % and 5.0 hours, respectively, whereby polypropylene resin composition X-14 was obtained. The reaction condition and the results of assessments are given in Table 2 and Table 10, respectively.

EXAMPLE 1-15

The polymerization was carried out as in Example 1-2 except that the polymerization temperature and the polymerization duration in the first stage polymerization were changed to 40° C. and 30 minutes, respectively, and the polymerization temperature and the polymerization duration in the second stage polymerization were changed to 40° C. and 45 minutes, respectively, whereby polypropylene resin composition X-15 was obtained. The reaction condition and the results of assessments are given in Table 3 and Table 10, respectively.

EXAMPLE 1-16

The polymerization was carried out as in Example 1-1 except that the internal pressure of the polymerization reactor and the polymerization duration in the first stage polymerization were changed to 0.49 MPa (5.0 kgf/cm², gauge) and 3.5 hours, respectively, and the internal pressure of the polymerization reactor, the hydrogen concentration in the gas phase and the polymerization duration in the second stage polymerization were changed to 0.24 MPa (2.4 kgf/cm², gauge), 27 vol. % and 3.7 hours, respectively, whereby polypropylene resin composition X-16 was obtained. The reaction condition and the results of assessments are given in Table 2 and Table 10, respectively.

Comparative Example 1-1

A polymerization reactor having an internal volume of 3,000 liters was charged under a nitrogen atmosphere with 1180 liters of heptane, 125 grams of diluted triethylaluminum, 217 grams of DCPMS and 55 grams of the solid titanium catalyst component-1 obtained in Production Example 1. After the nitrogen gas in the polymerization reactor was exhausted using a vacuum pump, the reactor was charged with propylene, whereupon the temperature of the reactor was started to elevate. At 70° C., propylene and hydrogen were supplied thereto continuously so as to maintain the internal pressure of the polymerization reactor at 0.74 MPa (7.5 kgf/cm² gauge) and the hydrogen concentration in the gas phase at 0.3 vol. %, whereupon the polymerization was continued for 6.0 hours. After the polymerization was over, 144.3 ml of methanol were added to the reactor to terminate the polymerization, followed by an ordinary procedure of purification and drying, whereby 700 kg of a powdery polypropylene resin composition were obtained. The polypropylene resin composition X-17 finally obtained in this way had, as a whole, a melt flow rate of 0.5 g/10 min. The reaction condition and the results of assessments are given in Table 6 and Table 11, respectively.

Comparative Example 1-2

The polymerization was carried out as in Comparative Example 1-1 except that the internal pressure of the polymerization reactor, the hydrogen concentration in the gas phase and the polymerization duration were changed to 0.88 MPa (9.0 kgf/cm², gauge), 0.1 vol. % and 7.0 hours, respectively, whereby polypropylene resin composition X-18 was obtained. The reaction condition and the results of assessments are given in Table 6 and Table 11, respectively.

Comparative Example 1-3

The polymerization was carried out as in Comparative Example 1-1 except that the internal pressure of the polymerization reactor, the hydrogen concentration in the gas phase and the polymerization duration were changed to 0.59 MPa (6.0 kgf/cm², gauge), 2 vol. % and 5.0 hours, respectively, whereby polypropylene resin composition X-19 was obtained. The reaction condition and the results of assessments are given in Table 6 and Table 11, respectively.

Comparative Example 1-4

The polymerization was carried out as in Example 1-1 except that the internal pressure and the polymerization duration in the first stage polymerization were changed to 0.49 MPa (5.0 kgf/cm², gauge) and 2.0 hours, respectively, and the internal pressure of the polymerization reactor, the hydrogen concentration in the gas phase and the polymerization duration in the second stage polymerization were changed to 0.27 MPa (2.8 kgf/cm², gauge), 32 vol. % and 3.7 hours, respectively, whereby polypropylene resin composition X-20 was obtained. The reaction condition and the results of assessments are given in Table 2 and Table 11, respectively.

Comparative Example 1-5

The polymerization was carried out as in Example 1-4 except that the internal pressure of the polymerization reactor-2 and the hydrogen concentration in the gas phase were changed to 0.59 MPa (6.0 kgf/cm$^2$, gauge) and 29 vol. %, respectively, whereby polypropylene resin composition X-21 was obtained. The reaction condition and the results of assessments are given in Table 5 and Table 11, respectively.

Comparative Example 1-6

The polymerization was carried out as in Example 1-1 except that the internal pressure and the polymerization duration in the first stage polymerization were changed to 0.49 MPa (5.0 kgf/cm$^2$, gauge) and 2.0 hours, respectively, and the internal pressure of the polymerization reactor, the hydrogen concentration in the gas phase and the polymerization duration in the second stage polymerization were changed to 0.25 MPa (2.6 kgf/cm$^2$, gauge), 27 vol. % and 3.9 hours, respectively, whereby polypropylene resin composition X-22 was obtained. The reaction condition and the results of assessments are given in Table 2 and Table 12, respectively.

Comparative Example 1-7

A polymerization reactor having an internal volume of 3,000 liters was charged under a nitrogen atmosphere with 1180 liters of heptane, 164 grams of diluted triethylaluminum, 284 grams of DCPMS and 72 grams of the solid titanium catalyst component-1 obtained in Production Example 1. After the nitrogen gas in the polymerization reactor was exhausted using a vacuum pump, the reactor was charged with propylene, whereupon the temperature of the reactor was started to elevate. At 60° C., propylene and hydrogen were supplied thereto continuously so as to maintain the internal pressure of the polymerization reactor at 0.32 MPa (3.3 kgf/cm$^2$, gauge) and the hydrogen concentration in the gas phase at 0.03 vol. %, whereupon the polymerization was continued for 3.0 hours. By sampling and analyzing a part of the slurry in the polymerization reactor after the completion of the first stage polymerization, an intrinsic viscosity [η] of 3.9 dl/g was observed (the first stage polymerization was over).

Then, the temperature was elevated to 70° C. and propylene and hydrogen were supplied continuously so as to maintain the internal pressure at 0.16 MPa (1.6 kgf/cm$^2$, gauge) and the hydrogen concentration in the gas phase at 6 vol. %, whereupon the polymerization was continued for 4.4 hours (the second stage polymerization was over). After the polymerization was over, 144.3 ml of methanol were added to the reactor to terminate the polymerization, followed by ordinary procedures of purification and drying, whereby 680 kg of a powdery polypropylene resin composition were obtained. The polypropylene resin composition finally obtained in this way had, as a whole, a melt flow rate of 0.5 g/10 min. The proportion of the polypropylene product produced by the first stage polymerization relative to the finally obtained polypropylene resin composition, as calculated from the material balance, was 50% by weight. Material properties of the finally obtained polypropylene resin composition X-23 were assessed. The reaction condition and the results of assessments are given in Table 2 and Table 12, respectively.

Comparative Example 1-8

A polymerization reactor having an internal volume of 3,000 liters was charged under a nitrogen atmosphere with 1180 liters of heptane, 164 grams of diluted triethylaluminum, 284 grams of DCPMS and 144 grams of the solid titanium catalyst component-1 obtained in Production Example 1. After the nitrogen gas in the polymerization reactor was exhausted using a vacuum pump, the reactor was charged with propylene, whereupon the temperature of the reactor was started to elevate. At 60° C., propylene was supplied thereto continuously so as to maintain the internal pressure of the polymerization reactor at 0.78 MPa (8.0 kgf/cm$^2$, gauge), whereupon the polymerization was continued for 2.5 hours. After the polymerization was over, 144.3 ml of methanol were added to the reactor to terminate the polymerization, followed by an ordinary procedure of purification and drying, whereby 670 kg of a powdery polypropylene resin composition X-24 were obtained. The reaction condition and the results of assessments are given in Table 6 and Table 12, respectively.

Comparative Example 1-9

An autoclave having an internal volume of 3,000 liters was charged under a nitrogen atmosphere with 1180 liters of heptane, 164 grams of diluted triethylaluminum, 284 grams of DCPMS and 138 grams of the solid titanium catalyst component-1 obtained in Production Example 1. After the nitrogen gas in the polymerization reactor was exhausted using a vacuum pump, the reactor was charged with propylene, whereupon the temperature of the reactor was started to elevate. At 70° C., propylene and hydrogen were supplied thereto continuously so as to maintain the internal pressure of the polymerization reactor at 0.88 MPa (9.0 kgf/cm$^2$ gauge) and the hydrogen concentration in the gas phase at 6 vol. %, whereupon the polymerization was continued for 6.0 hours. After the polymerization was over, 144.3 ml of methanol were added to the reactor to terminate the polymerization, followed by an ordinary procedure of purification and drying, whereby 690 kg of a powdery polypropylene resin composition X-25 were obtained. The reaction condition and the results of assessments are given in Table 6 and Table 12, respectively.

Comparative Example 1-10

Polymerization of a lower molecular weight polypropylene was carried out using two polymerization reactors in the first stage polymerization. Thus, a polymerization reactor-1 having an internal volume of 300 liters was supplied continuously with heptane at a rate of 74 liters/hr, the prepolymerization catalyst component-3 as the catalyst at a rate of 10.4 g/hr, triethylaluminum at a rate of 19.8 g/hr and DCPMS at a rate of 40.3 g/hr, while supplying thereto at a temperature of 70° C. propylene and hydrogen continuously so as to maintain the internal pressure of the polymerization reactor at 0.59 MPa (6.0 kgf/cm$^2$, gauge) and the hydrogen concentration in the gas phase at 2.0 vol. %. Then, the slurry in the polymerization reactor-1 was transferred to a polymerization reactor-2 having an internal volume of 500 liters continuously to subject it to a further polymerization. The polymerization reactor-2 was supplied with heptane at a rate of 71 liters/hr, while supplying thereto propylene and hydrogen continuously at a temperature of 70° C. so as to maintain the internal pressure of the polymerization reactor-2 at 0.49 MPa (5.0 kgf/cm$^2$, gauge) and the hydrogen concentration in the gas phase at 2.0 vol. %. By sampling the slurries of the reactor-1 and the reactor-2 to assess the intrinsic viscosity [η] of each of the polymers, a value of 1.9 dl/g was observed for each.

The slurry in the polymerization reactor-2 was then transferred continuously to a dehydrogenating vessel having an internal volume of 70 liters to purge the unreacted propylene and hydrogen continuously. The slurry in the dehydrogenating vessel was transferred to polymerization reactor-3 continuously to effect the second stage polymerization of high molecular weight polypropylene. The polymerization ractor-3 was supplied with heptane at a rate of 10 liters/hr, while supplying thereto propylene continuously at a temperature of 60° C. so as to maintain the internal pressure of the polymerization reactor at 0.78 MPa (8.0 kgf/cm$^2$, gauge).

The slurry discharged from the polymerization reactor-3 was treated in usual manner, after separation of unreacted monomer, by centrifugation to remove heptane and drying at 80° C. under a pressure of 9,300 Pa (70 mm Hg, gauge) for 10 hours to obtain a product. This powdery product was obtained at a through-put of 81 kg/hr. The melt flow rate of this product was found to be 0.5 g/10 min. The proportion of the polypropylene product produced in the polymerization reactor-3 of the second stage polymerization relative to the amount of the finally obtained polypropylene resin composition as calculated from the material balance was found to be 30% by weight and the intrinsic viscosity [η] thereof was found to be 7.2 dl/g. Material properties of the finally obtained polypropylene resin composition X-26 were assessed. The reaction condition and the results of assessments are given in Table 5 and Table 12, respectively.

Comparative Example 1-11

30 parts by weight of the polypropylene resin composition X-24 obtained in Comparative Example 1-8 and 70 parts by weight of the polypropylene resin composition X-25 obtained in Comparative Example 1-9 were blended together with a predetermined stabilizer and the resulting blend was kneaded and extruded on a monoaxial extruder (a machine of Ishinaka Tekkojo K.K.) at a temperature of 240° C., whereby polypropylene resin composition X-27 was obtained. Results are given in Table 13.

Comparative Example 1-12

A polymerization reactor having an internal volume of 3,000 liters was charged under a nitrogen atmosphere with 1180 liters of heptane, 148 grams of diluted diethylaluminum chloride and 118 grams of a titanium trichloride catalyst supplied from NIPPON SOLVAY K.K. After the nitrogen gas in the polymerization reactor was exhausted using a vacuum pump, the reactor was charged with propylene, whereupon the temperature of the reactor was started to elevate. At 60° C., propylene and hydrogen were supplied thereto continuously so as to maintain the internal pressure of the polymerization reactor at 0.78 MPa (8.0 kgf/cm$^2$, gauge) and the hydrogen concentration in the gas phase at 12 vol. %, whereupon the polymerization was continued for 3.0 hours. By sampling and analyzing a part of the slurry in the polymerization reactor, an intrinsic viscosity [η] of 1.1 dl/g was observed (the first stage polymerization was over).

Then, the unreacted propylene and hydrogen in the polymerization reactor were once purged. Thereafter, the temperature was settled at 50° C. and propylene was supplied continuously so as to maintain the internal pressure at 0.69 MPa (7.0 kgf/cm$^2$, gauge), whereupon the polymerization was continued for 4.0 hours (the second stage polymerization was over). After the polymerization was over, 144.3 ml of methanol were added to the reactor to terminate the polymerization, followed by an ordinary procedure of purification and drying, whereby 120 kg of a powdery polypropylene resin composition were obtained. The resulting polypropylene resin composition had, as a whole, a melt flow rate of 0.4 g/10 min. The proportion of the polypropylene product produced in the second stage polymerization relative to the finally obtained polypropylene resin composition, as calculated from the material balance, was 40% by weight and the intrinsic viscosity [η] thereof was found to be 10.0 dl/g. Material properties of the finally obtained polypropylene resin composition X-28 were assessed. The reaction condition and the results of assessments are given in Table 2 and Table 13, respectively.

Comparative Example 1-13

To a polymerization reactor-1 having an internal volume of 250 liters, there were supplied continuously the prepolymerization catalyst component-4 obtained in Production Example 4 in a form of a hexane slurry at a rate of 0.56 mmol/hr as titanium atom, triethylaluminum in a form of a hexane solution at a rate of 28 mmol/hr, diphenyldimethoxysilane in a form of a hexane solution at a rate of 2.8 mmol/hr and hexane in a rate to sum up to 27.3 liters/hr of the total feed, while supplying thereto propylene continuously at such a rate as to maintain the inner pressure of the polymerization reactor-1 at 1.2 MPa (12 kgf/cm$^2$, gauge) to effect polymerization at a temperature of 70° C. (the first stage polymerization). By sampling the slurry in the polymerization reactor-1 and assessing the intrinsic viscosity [η] thereof, a value of 7.1 dl/g was obtained.

The slurry in the polymerization reactor-1 which had been subjected to the first stage polymerization was transferred to polymerization reactor-2 having an internal volume of 250 liters continuously to subject it to a further polymerization. The polymerization reactor-2 was supplied continuously with propylene and hexane at a total rate of 11 liters/hr to effect polymerization at a temperature of 70° C. By supplying hydrogen thereto continuously, the intrinsic viscosity [η] was adjusted (the second stage polymerization).

The slurry discharged from the polymerization reactor-2 was treated in usual manner, after separation of unreacted monomer, by centrifugation to remove heptane and drying at 80° C. under a pressure of 9,300 Pa (70 mm Hg, gauge) for 10 hours to obtain a product. The melt flow rate of this product was found to be 0.5 g/10 min. The proportion of the polypropylene product produced in the first stage polymerization relative to the amount of the finally obtained polypropylene resin composition as calculated from the material balance was found to be 35% by weight. Material properties of the finally obtained polypropylene resin composition X-29 were assessed. The reaction condition and the results of assessments are given in Table 7 and Table 13, respectively.

Comparative Example 1-14

The procedures of Comparative Example 13 were traced except that the reaction rate and the intrinsic viscosity [η] for each polymerization stage were altered. Material properties of the finally obtained polypropylene resin composition X-30 were assessed. The reactions condition and the results of assessments are given in Table 7 and Table 13, respectively.

TABLE 1

Reaction Condition

|  |  | Example | | | | | |
|---|---|---|---|---|---|---|---|
|  |  | 1-1 | 1-3 | 1-9 | 1-11 | 1-12 | 1-13 |
| Polypropylene Resin Composition |  | X-1 | X-3 | X-9 | X-11 | X-12 | X-13 |
| 1st Stage Polymerization |  |  |  |  |  |  |  |
| Amount of heptane charged | (liter) | 1180 | 1180 | 1180 | 1180 | 1180 | 1180 |
| Organometallic compound used |  | TEA | TEA | TEA | TEA | TEA | TEA |
| amount | (g) | 137 | 137 | 137 | 137 | 137 | 137 |
| Titanium catalyst component used |  | comt. 1 | comt. 1 | comt. 1 | comt. 1 | comt. 1 | comt. 1 |
| amount | (g) | 72 | 72 | 72 | 72 | 72 | 72 |
| Organosilicic compound used |  | DCPMS | DCPMS | DCPMS | DCPMS | DCPMS | DCPMS |
| amount | (g) | 279 | 279 | 279 | 279 | 279 | 279 |
| Polymerization temperature | (° C.) | 60 | 60 | 60 | 60 | 60 | 60 |
| pressure | (MPa, gauge) | 0.64 | 0.64 | 0.49 | 0.49 | 0.49 | 0.49 |
| $H_2$ conc. in the gas phase | (vol. %) | 0 | 0 | 0 | 0 | 0 | 0 |
| Polymerization duration | (hr) | 2.2 | 2.2 | 3.0 | 1.5 | 1.5 | 1.8 |
| 2nd Stage Polymerization |  |  |  |  |  |  |  |
| Polymerization temperature | (° C.) | 70 | 70 | 70 | 70 | 70 | 70 |
| pressure | (MPa, gauge) | 0.12 | 0.098 | 0.20 | 0.18 | 0.13 | 0.26 |
| $H_2$ conc. in the gas phase | (vol. %) | 5.1 | 14 | 25 | 0.7 | 19 | 29 |
| Polymerization duration | (hr) | 4.0 | 4.0 | 4.0 | 5.0 | 5.0 | 3.8 |

Notes:
TEA = triethylaluminum
DEAC = diethylaluminum chloride
DCPMS = dicyclopentyldimethoxysilane

TABLE 2

Reaction Condition

|  |  | Example | | Comparative Example | | | |
|---|---|---|---|---|---|---|---|
|  |  | 1-14 | 1-16 | 1-4 | 1-6 | 1-7 | 1-12 |
| Polypropylene Resin Composition |  | X-14 | X-16 | X-20 | X-22 | X-23 | X-28 |
| 1st Stage Polymerization |  |  |  |  |  |  |  |
| Amount of heptane charged | (liter) | 1180 | 1180 | 1180 | 1180 | 1180 | 1180 |
| Organometallic compound used |  | TEA | TEA | TEA | TEA | TEA | DEAC |
| amount | (g) | 1137 | 137 | 137 | 137 | 164 | 148 |
| Titanium catalyst component used |  | comt. 1 | comt. 1 | comt. 1 | comt. 1 | comt. 1 | $TiCl_3$ |
| amount | (g) | 72 | 72 | 72 | 72 | 72 | 118 |
| Organosilicic compound used |  | DCPMS | DCPMS | DCPMS | DCPMS | DCPMS | non |
| amount | (g) | 279 | 279 | 279 | 279 | 284 | 0 |
| Polymerization temperature | (° C.) | 60 | 60 | 60 | 60 | 60 | 60 |
| pressure | (MPa, gauge) | 0.49 | 0.49 | 0.49 | 0.49 | 0.32 | 0.78 |
| $H_2$ conc. in the gas phase | (vol. %) | 0 | 0 | 0 | 0 | 0.03 | 12 |
| Polymerization duration | (hr) | 2.0 | 3.5 | 2.0 | 2.0 | 3.0 | 3.0 |
| 2nd Stage Polymerization |  |  |  |  |  |  |  |
| Polymerization temperature | (° C.) | 70 | 70 | 70 | 70 | 70 | 50 |
| pressure | (MPa, gauge) | 0.24 | 0.24 | 0.27 | 0.25 | 0.16 | 0.69 |

TABLE 2-continued

| | | Reaction Condition | | | | | |
|---|---|---|---|---|---|---|---|
| | | Example | | Comparative Example | | | |
| | | 1-14 | 1-16 | 1-4 | 1-6 | 1-7 | 1-12 |
| H$_2$ conc. in the gas phase | (vol. %) | 0.2 | 27 | 32 | 27 | 6 | 0 |
| Polymerization duration | (hr) | 5.0 | 3.7 | 3.7 | 3.9 | 4.4 | 4.0 |

Notes:
TEA = triethylaluminum
DEAC = diethylaluminum chloride
DCPMS = dicyclopentyldimethoxysilane

TABLE 3

| | | Reaction Condition | | |
|---|---|---|---|---|
| | | Example | | |
| | | 1-2 | 1-10 | 1-15 |
| Polypropylene Resin Composition | | X-2 | X-10 | X-15 |
| 1st Stage Polymerization | | | | |
| Amount of propylene charged | (liter) | 200 | 200 | 200 |
| Triethylaluminum amount | (mmol) | 0.3 | 0.3 | 0.3 |
| DCPMS amount | (mmol) | 0.13 | 0.13 | 0.13 |
| Titanium catalyst component used | | compot. 2 | compot. 2 | compot. 2 |
| amount | (mmol) *) | 0.6 | 0.6 | 0.6 |
| Polymerization temperature | (° C.) | 70 | 70 | 40 |
| pressure | (MPa, gauge) | — | — | — |
| duration | (min.) | 20 | 25 | 30 |
| 2nd Stage Polymerization | | | | |
| Polymerization temperature | (° C.) | 70 | 70 | 40 |
| pressure | (MPa, gauge) | — | — | — |
| Hydrogen partial pressure | (MPa, gauge) | 0.05 | 0.07 | 0.05 |
| Polymerization duration | (min.) | 35 | 35 | 45 |

Notes:
DCPMS = dicyclopentyldimethoxysilane
*)calculated as titanium atom

TABLE 4

| | | Example | | | |
|---|---|---|---|---|---|
| | | 1-4 | 1-5 | 1-6 | 1-7 |
| Polypropylene resin composition | | X-4 | X-5 | X-6 | X-7 |
| Prepolymerization | | | | | |
| Solid titanium catalyst component | | Compont.-1 | Compont.-1 | Compont.-1 | Compont.-1 |
| Prepolymerization temperature | (° C.) | 10 | 10 | 10 | 10 |
| Polymerization Reactor-1 | | | | | |
| Supply rate of heptane | (lit./hr) | 87 | 87 | 151 | 53 |
| Supply rate of prepolym. catalyst | (g/hr) | 9.6 | 7.4 | 8.9 | 8.0 |
| Supply rate of triethylaluminum | (g/hr) | 18.2 | 13.5 | 16.9 | 15.2 |
| Supply rate of DCPMS | (g/hr) | 37.2 | 28.7 | 34.5 | 31 |
| Polymerization temperature | (° C.) | 60 | 60 | 55 | 60 |
| Polymerization pressure | (MPa) | 0.69 | 0.69 | 0.78 | 0.76 |
| H$_2$-concentration in gas phase | (vol. %) | 0 | 0 | 0 | 0 |
| Polymerization reactor-2 | | | | | |
| Supply rate of heptane | (lit./hr) | 32 | 40 | 14.7 | 56 |
| Polymerization temperature | (° C.) | 70 | 70 | 70 | 70 |
| Polymerization pressure | (MPa) | 0.69 | 0.59 | 0.78 | 0.21 |
| H$_2$-concentration in gas phase | (vol. %) | 6 | 23 | 6 | 6 |

TABLE 4-continued

|  |  | Example | | | |
|---|---|---|---|---|---|
|  |  | 1-4 | 1-5 | 1-6 | 1-7 |
| Polymerization reactor-3 | | | | | |
| Supply rate of heptane | (lit./hr) | — | — | 16.4 | 24 |
| Polymerization temperature | (° C.) | — | — | 70 | 70 |
| Polymerization pressure | (MPa) | — | — | 0.74 | 0.15 |
| H$_2$-concentration in gas phase | (vol. %) | — | — | 6 | 6 |
| Polymerization reactor-4 | | | | | |
| Supply rate of heptane | (lit./hr) | — | — | — | 17 |
| Polymerization temperature | (° C.) | — | — | — | 70 |
| Polymerization pressure | (MPa) | — | — | — | 0.098 |
| H$_2$-concentration in gas phase | (vol. %) | — | — | — | 6 |
| Polymerization reactor-5 | | | | | |
| Supply rate of heptane | (lit./hr) | — | — | — | 10 |
| Polymerization temperature | (° C.) | — | — | — | 70 |
| Polymerization pressure | (MPa) | — | — | — | 0.020 |
| H$_2$-concentration in gas phase | (vol. %) | — | — | — | 6 |

DCPMS: dicyclopentyldimethoxysilane

TABLE 5

|  |  | Example | Comparative Example | |
|---|---|---|---|---|
|  |  | 1-8 | 1-5 | 1-10 |
| Polypropylene resin composition | | X-8 | X-21 | X-26 |
| Prepolymerization | | | | |
| Solid titanium catalyst component | | Compont.-1 | Compont.-1 | Compont.-1 |
| Prepolymerization temperature | (° C.) | 10 | 10 | 10 |
| Polymerization Reactor-1 | | | | |
| Supply rate of heptane | (lit./hr) | 53 | 87 | 74 |
| Supply rate of prepolym. catalyst | (g/hr) | 5.4 | 9.6 | 10.4 |
| Supply rate of triethylaluminum | (g/hr) | 10.3 | 18.2 | 19.8 |
| Supply rate of DCPMS | (g/hr) | 20.9 | 37.2 | 40.3 |
| Polymerization temperature | (° C.) | 60 | 60 | 70 |
| Polymerization pressure | (MPa) | 0.76 | 0.69 | 0.59 |
| H$_2$-concentration in gas phase | (vol. %) | 0 | 0 | 2 |
| Polymerization reactor-2 | | | | |
| Supply rate of heptane | (lit./hr) | 70 | 32 | 71 |
| Polymerization temperature | (° C.) | 70 | 70 | 70 |
| Polymerization pressure | (MPa) | 0.61 | 0.59 | 0.49 |
| H$_2$-concentration in gas phase | (vol. %) | 30 | 29 | 2 |
| Polymerization reactor-3 | | | | |
| Supply rate of heptane | (lit./hr) | 10 | — | 10 |
| Polymerization temperature | (° C.) | 70 | — | 60 |
| Polymerization pressure | (MPa) | 0.47 | — | 0.78 |
| H$_2$-concentration in gas phase | (vol. %) | 6 | — | 0.05 |
| Polymerization reactor-4 | | | | |
| Supply rate of heptane | (lit./hr) | 15 | — | — |
| Polymerization temperature | (° C.) | 70 | — | — |
| Polymerization pressure | (MPa) | 0.52 | — | — |
| H$_2$-concentration in gas phase | (vol. %) | 30 | — | — |
| Polymerization reactor-5 | | | | |
| Supply rate of heptane | (lit./hr) | 10 | — | — |
| Polymerization temperature | (° C.) | 70 | — | — |
| Polymerization pressure | (MPa) | 0.32 | — | — |
| H$_2$-concentration in gas phase | (vol. %) | 30 | — | — |

DCPMS: dicyclopentyldimethoxysilane

TABLE 6

Reaction Condition

| | | Comparative Example | | | | |
|---|---|---|---|---|---|---|
| | | 1-1 | 1-2 | 1-3 | 1-8 | 1-9 |
| Polypropylene Resin Composition | | X-17 | X-18 | X-19 | X-24 | X-25 |
| Polymerization Reactor-1 | | | | | | |
| Amount of heptane charge | (liter) | 1180 | 1180 | 1180 | 1180 | 1180 |
| Amount of triethylaluminum | (gram) | 125 | 125 | 125 | 164 | 164 |
| Organosilicic compound used | | DCPMS | DCPMS | DCPMS | DCPMS | DCPMS |
| charged amount | (gram) | 217 | 217 | 217 | 284 | 284 |
| Titanium catalyst component used | | compt.-1 | compt.-1 | compt.-1 | compt.-1 | compt.-1 |
| charged amount | (gram) | 55 | 55 | 55 | 144 | 138 |
| Polymerization temperature | (° C.) | 70 | 70 | 70 | 60 | 70 |
| Polymerization pressure | (MPa, gauge) | 0.74 | 0.88 | 0.59 | 0.78 | 0.88 |
| $H_2$-concentration in gas phase | (vol. %) | 0.3 | 0.1 | 2 | 0 | 6 |
| Polymerization duration | (hr) | 6.0 | 7.0 | 5.0 | 2.5 | 6.0 |

DCPMS = dicyclopentyldimethoxysilane

TABLE 7

Reaction Condition

| | | Comparative Example | |
|---|---|---|---|
| | | 1-13 | 1-14 |
| Polypropylene Resin Composition | | X-29 | X-30 |
| Prepolymerization | | | |
| Titanium catalyst component used | | Compont.-2 | Compont.-2 |
| charged amount | (mmol) *) | 270 | 270 |
| TEA | (mmol) | 2700 | 2700 |
| DPDMS | (mmol) | 540 | 540 |
| Prepolymerization duration | (hr) | 1.5 | 1.5 |
| Prepolymerization temperature | (° C.) | 25 | 25 |
| Polymerization Reactor-1 | | | |
| Supply rate of hexane | (l/hr) | 27.3 | 27.3 |
| Supply rate of prepolym. catalyst | (mmol/hr) *) | 0.56 | 0.56 |
| Supply rate of TEA | (mmol/hr) | 28 | 28 |
| Supply rate of DPDMS | (mmol/hr) | 2.8 | 2.8 |
| Polymerization temperature | (° C.) | 70 | 70 |
| Polymerization pressure | (MPa, gauge) | 1.2 | 1.2 |
| $H_2$ concentration in gas phase | (vol. %) | 0 | 0 |
| Polymerization Reactor-2 | | | |
| Supply rate of propylene + hexane | (l/hr) | 11 | 11 |
| Polymerization temperature | (° C.) | 70 | 70 |

Notes:
*) calculated as titanium atom
TEA = triethylaluminum
DPDMS = diphenyldimethoxysilane

TABLE 8

| | | Example | | | | |
|---|---|---|---|---|---|---|
| | | 1-1 | 1-2 | 1-3 | 1-4 | 1-5 |
| Polypropylene Resin Composition | | X-1 | X-2 | X-3 | X-4 | X-5 |
| Melt flow rate | (g/10 min) [1] | 0.5 | 0.6 | 1.6 | 0.5 | 4.2 |
| Intri. viscos. of high mol. wt. PP | (dl/g) [2] | 8.7 | 11.0 | 9.1 | 9.1 | 9.3 |
| Cont. of high mol. wt. PP | (wt. %) | 30 | 32 | 30 | 30 | 26 |
| Number of gels | (per 450 cm$^2$) [3] | 4 | 10 | 15 | 718 | 2858 |
| (mmmm) fraction | (%) [4] | 98.4 | 98.2 | 98.3 | 98.4 | 98.2 |
| Mw/Mn | (-) [5] | 11.5 | 9.9 | 14.0 | 10.5 | 18.0 |
| Mz/Mw | (-) [6] | 4.1 | 4.5 | 5.2 | 4.3 | 5.5 |
| Proportion of high mol. wt. part | (%) [7] | 14 | 16 | 15 | 15 | 12 |
| $S_H/S_L$ | (-) [8] | 1.44 | 1.49 | 1.46 | 1.42 | 1.51 |
| Melt tension | (g) [9] | 12.1 | 10.8 | 6.6 | 11.5 | 5.7 |
| Critical shearing rate | (sec$^{-1}$) [10] | $1.82 \times 10^2$ | $9.12 \times 10^2$ | $1.82 \times 10^3$ | $1.82 \times 10^2$ | $6.57 \times 10^2$ |

TABLE 8-continued

|  |  | Example | | | | |
| --- | --- | --- | --- | --- | --- | --- |
|  |  | 1-1 | 1-2 | 1-3 | 1-4 | 1-5 |
| Value calculated from formula (I) | (–) [11] | 7.4 | 0.6 | –2.2 | 7.4 | 2.0 |
| Frexural modulus | (MPa) [12] | 1846 | 1716 | 1798 | 1920 | 2056 |
| Method of production |  | 2 stage, batch, slurry | 2 stage, batch, bulk | 2 stage, batch, slurry | 2 stage, cont., slurry | 2 stage, cont., slurry |

TABLE 9

|  |  | Example | | | | |
| --- | --- | --- | --- | --- | --- | --- |
|  |  | 1-6 | 1-7 | 1-8 | 1-9 | 1-10 |
| Polypropylene Resin Composition |  | X-6 | X-7 | X-8 | X-9 | X-10 |
| Melt flow rate | (g/10 min) [1] | 0.4 | 0.5 | 4.0 | 0.7 | 0.4 |
| Intri. viscos. of high mol. wt. PP | (dl/g) [2] | 9.2 | 9.5 | 9.4 | 9.6 | 9.6 |
| Cont. of high mol. wt. PP | (wt. %) | 33 | 32 | 25 | 42 | 37 |
| Number of gels | (per 450 cm$^2$) [3] | 665 | 340 | 873 | 9 | 8 |
| (mmmm) fraction | (%) [4] | 98.3 | 98.3 | 98.3 | 98.2 | 98.3 |
| Mw/Mn | (–) [5] | 14.4 | 9.8 | 18.9 | 19.0 | 6.3 |
| Mz/Mw | (–) [6] | 3.8 | 4.0 | 5.6 | 4.8 | 4.0 |
| Proportion of high mol. wt. part | (%) [7] | 15 | 16 | 13 | 20 | 18 |
| $S_H/S_L$ | (–) [8] | 1.42 | 1.43 | 1.53 | 1.45 | 1.43 |
| Melt tension | (g) [9] | 14.4 | 12.2 | 5.6 | 10.6 | 10.8 |
| Critical shearing rate | (sec$^{-1}$) [10] | 1.82 × 10$^2$ | 1.82 × 10$^2$ | 6.57 × 10$^2$ | 1.22 × 10$^2$ | 1.22 × 10$^2$ |
| Value calculated from formula (I) | (–) [11] | 7.4 | 7.4 | 2.0 | 9.0 | 9.0 |
| Frexural modulus | (MPa) [12] | 2067 | 1949 | 2064 | 1849 | 1700 |
| Method of production |  | 2 stage, cont., slurry [13] | 2 stage, cont., slurry [14] | 2 stage, cont., slurry [14] | 2 stage, batch, slurry | 2 stage, batch, bulk |

Notes:
[13] The second stage polymerization was carried out using two polymerization reactors in a continuous process.
[14] The second stage polymerization was carried out using four polymerization reactors in a continuous process.

TABLE 10

|  |  | Example | | | | | |
| --- | --- | --- | --- | --- | --- | --- | --- |
|  |  | 1-11 | 1-12 | 1-13 | 1-14 | 1-15 | 1-16 |
| Polypropylene Resin Composition |  | X-11 | X-12 | X-13 | X-14 | X-15 | X-16 |
| Melt flow rate | (g/10 min) [1] | 0.5 | 3.8 | 4.0 | 0.1 | 0.5 | 0.5 |
| Intri. viscos. of high mol. wt. PP | (dl/g) [2] | 8.9 | 9.6 | 9.4 | 8.9 | 9.2 | 9.4 |
| Cont. of high mol. wt. PP | (wt. %) | 18 | 18 | 25 | 30 | 29 | 47 |
| Number of gels | (per 450 cm$^2$) [3] | 5 | 17 | 20 | 3 | 5 | 6 |
| (mmmm) fraction | (%) [4] | 98.4 | 98.3 | 98.2 | 98.4 | 97.3 | 98.4 |
| Mw/Mn | (–) [5] | 8.3 | 17.2 | 18.9 | 6.8 | 10.9 | 9.0 |
| Mz/Mw | (–) [6] | 3.7 | 4.3 | 5.6 | 3.9 | 4.2 | 3.7 |
| Proportion of high mol. wt. part | (%) [7] | 9 | 10 | 12 | 19 | 14 | 30 |
| $S_H/S_L$ | (–) [8] | 1.50 | 1.51 | 1.53 | 1.39 | 1.43 | 1.53 |
| Melt tension | (g) [9] | 8.7 | 5.3 | 5.6 | 19.5 | 11.4 | 25.4 |
| Critical shearing rate | (sec$^{-1}$) [10] | 1.82 × 10$^2$ | 6.57 × 10$^2$ | 6.57 × 10$^2$ | 6.57 × 10$^1$ | 6.57 × 10$^2$ | 6.57 × 10$^1$ |
| Value calculated from formula (I) | (–) [11] | 7.4 | 2.0 | 2.0 | 11.6 | 2.0 | 11.6 |
| Frexural modulus | (MPa) [12] | 1813 | 1850 | 2064 | 1805 | 1621 | 1945 |
| Method of production |  | 2 stage, batch, slurry | 2 stage, batch, slurry | 2 stage, batch, slurry | 2 stage, batch, slurry | 2 stage, batch, slurry | 2 stage, batch, slurry |

TABLE 11

| Polypropylene Resin Composition | Comparative Example | | | | |
|---|---|---|---|---|---|
| | 1-1<br>X-17 | 1-2<br>X-18 | 1-3<br>X-19 | 1-4<br>X-20 | 1-5<br>X-21 |
| Melt flow rate (g/10 min) [1] | 0.5 | 0.2 | 3.510 | 6.2 | 5.9 |
| Intri. viscos. of high mol. wt. PP (dl/g) [2] | — | — | — | 8.9 | 9.2 |
| Content of high mol. wt. PP (wt. %) | 0 | 0 | 0 | 30 | 29 |
| Number of gels (per 450 cm$^2$) [3] | 4 | 5 | 3 | 25 | 3510 |
| (mmmm) fraction (%) [4] | 98.4 | 98.2 | 98.2 | 98.1 | 98.1 |
| Mw/Mn (—) [5] | 5.1 | 4.2 | 4.5 | 22.1 | 23.2 |
| Mz/Mw (—) [6] | 3.2 | 2.6 | 2.7 | 6.3 | 6.3 |
| Proportion of high mol. wt. part (%) [7] | 8 | 9 | 1 | 14 | 14 |
| $S_H/S_L$ (—) [8] | 1.22 | 1.21 | 1.12 | 1.45 | 1.44 |
| Melt tension (g) [9] | 4.8 | 10.4 | 1.6 | 2.3 | 2.5 |
| Critical shearing rate (sec$^{-1}$) [10] | $1.82 \times 10^2$ | $6.08 \times 10^1$ | $1.82 \times 10^3$ | $1.82 \times 10^3$ | $1.82 \times 10^3$ |
| Value calculated from formula (I) (—) [11] | 7.4 | 11.9 | -2.2 | -2.2 | -2.2 |
| Frexural modulus (MPa) [12] | 1410 | 1443 | 1495 | 1820 | 1790 |
| Method of production | batch,<br>slurry | batch,<br>slurry | batch,<br>slurry | 2 stage,<br>batch,<br>slurry | 2 stage,<br>cont.,<br>slurry |

TABLE 12

| Polypropylene Resin Composition | Comparative Example | | | | |
|---|---|---|---|---|---|
| | 1-6<br>X-22 | 1-7<br>X-23 | 1-8<br>X-24 | 1-9<br>X-25 | 1-10<br>X-26 |
| Melt flow rate (g/10 min) [1] | 3.3 | 0.5 | — | 35 | 0.5 |
| Intri. viscos. of high mol. wt. PP (dl/g) [2] | 9.1 | 3.9 | 9.4 | — | 7.2 |
| Content of high mol. wt. PP (wt. %) | 10 | 50 | 100 | 0 | 30 |
| Number of gels (per 450 cm$^2$) [3] | 15 | 5 | — | 2 | 3320 |
| (mmmm) fraction (%) [4] | 98.4 | 98.3 | 98.3 | 98.1 | 98.1 |
| Mw/Mn (—) [5] | 18.3 | 5.5 | — | 4.9 | 9.5 |
| Mz/Mw (—) [6] | 4.5 | 3.1 | — | 2.8 | 3.3 |
| Proportion of high mol. wt. part (%) [7] | 4.5 | 7 | — | 1 | 11 |
| $S_H/S_L$ (—) [8] | 1.41 | 1.13 | — | 1.11 | 1.31 |
| Melt tension (g) [9] | 3.1 | 4.6 | — | — | 6.3 |
| Critical shearing rate (sec$^{-1}$) [10] | $6.57 \times 10^2$ | $1.82 \times 10^2$ | — | — | $6.08 \times 10^2$ |
| Value calculated from formula (I) (—) [11] | 2.0 | 7.4 | — | — | 2.3 |
| Frexural modulus (MPa) [12] | 1632 | 1433 | — | — | 1652 |
| Method of production | 2 stage,<br>batch,<br>slurry | 2 stage,<br>batch,<br>slurry | 1 stage,<br>batch,<br>slurry | 1 stage,<br>batch,<br>slurry | 2 stage,<br>cont.,<br>slurry |

TABLE 14

| Polypropylene Resin Composition | Comparative Example | | | |
|---|---|---|---|---|
| | 1-11<br>X-27 | 1-12<br>X-28 | 1-13<br>X-29 | 1-14<br>X-30 |
| Melt flow rate (g/10 min) [1] | 0.5 | 0.4 | 0.5 | 0.5 |
| Intri. viscos. of high mol. wt. PP (dl/g) [2] | 9.4 | 10.0 | 7.1 | 7.2 |
| Content of high mol. wt. PP (wt. %) | 30 | 40 | 35 | 55 |
| Number of gels (per 450 cm$^2$) [3] | 7850 | 8 | 7 | 8 |
| (mmmm) fraction (%) [4] | 98.2 | 96.3 | 96.2 | 96.1 |
| Mw/Mn (—) [5] | 10.3 | 38.2 | 12.4 | 9.5 |
| Mz/Mw (—) [6] | 4.1 | 4.0 | 3.4 | 3.3 |
| Proportion of high mol. wt. part (%) [7] | 14 | 22 | 13 | 20 |
| $S_H/S_L$ (—) [8] | 1.46 | 1.50 | 1.38 | 1.24 |
| Melt tension (g) [9] | 10.3 | 9.2 | 5.1 | 8.2 |
| Critical shearing rate (sec$^{-1}$) [10] | $1.82 \times 10^2$ | $6.08 \times 10^1$ | $1.82 \times 10^2$ | $6.08 \times 10^1$ |

TABLE 14-continued

| Polypropylene Resin Composition | Comparative Example | | | |
|---|---|---|---|---|
| | 1-11<br>X-27 | 1-12<br>X-28 | 1-13<br>X-29 | 1-14<br>X-30 |
| Value calculated from formula (I) (—) [11] | 7.4 | 11.9 | 7.4 | 11.9 |
| Frexural modulus (MPa) [12] | 1723 | 1550 | 1512 | 1492 |
| Method of production | Melt-mixing | 2 stage, batch, slurry | 2 stage, cont., slurry | 2 stage, cont., slurry |

<<Blow Molding>>

EXAMPLE 2-1

The polypropylene resin composition X-2 obtained in Example 1-2 was processed by adding thereto a predetermined stabilizer, melting the resulting blend at 230° C. and extruding it using a hollow extruder of Model NB-20S of The Japan Steel Works, Ltd. into a parison. The weight of the parison was 3 kg. The mold was closed thereafter at once, whereupon compressed air of 0.6 MPa (6 kgf/cm$^2$, gauge) was blown into the inside space of the parison to blow-molding it into a squared blown bottle of 20 liter capacity. No draw-down of parison occurred and the moldability was better. The appearance of the resulting bottle was also better. Results are given in Table 14.

EXAMPLE 2-2

The polypropylene resin composition X-14 obtained in Example 1-14 was processed by adding thereto a predetermined stabilizer, melting the resulting blend at 230° C. and extruding it using a hollow extruder (Plako 3XY-12. Type 15) into a parison. The weight of the parison was 5 kg. The mold was closed thereafter at once, whereupon compressed air of 0.6 MPa (6 kgf/cm$^2$, gauge) was blown into the inside space of the parison to blow-molding it into a spoiler. No draw-down of parison occurred and the moldability was better. The appearance of the resulting blow-molded article was also better. Results are given in Table 14.

EXAMPLE 2-3

The polypropylene resin composition X-16 obtained in Example 1-16 was processed by adding thereto a predetermined stabilizer, melting the resulting blend at 240° C. and extruding it using a hollow extruder (Plako 3XY-12. Type 15) into a parison. The weight of the parison was 5 kg. The mold was closed thereafter at once, whereupon compressed air of 0.6 MPa (6 kgf/cm$^2$, gauge) was blown into the inside space of the parison to blow-molding it into a spoiler. No draw-down of parison occurred and the moldability was better. The appearance of the resulting blow-molded article was also better. Results are given in Table 14.

Comparative Example 2-1

In the same manner as in Example 2-1, except that polypropylene resin composition X-17 obtained in Comparative Example 1-1 was employed in the place of polypropylene resin composition X-2, blow molding of a squared blown bottle of 20 liter capacity was tried. No blown bottle exhibiting better appearance was obtained due to occurrence of draw-down. Results are given in Table 14.

Comparative Example 2-2

In the same manner as in Example 2-2, except that polypropylene resin composition X-18 obtained in Comparative Example 1-2 was employed in the place of polypropylene resin composition X-14, blow molding of a spoiler was tried. However, no spoiler exhibiting better appearance was obtained due to inferior moldability. Results are given in Table 14.

Comparative Example 2-3

In the same manner as in Example 2-3, except that polypropylene resin composition X-30 obtained in Comparative Example 1-14 was employed in the place of polypropylene resin composition X-16, blow molding of a spoiler was tried. No spoiler exhibiting better appearance was obtained. A draw-down of the parison occurred during the blow molding due to insufficient melt tension of the polypropylene resin composition X-30, so that any spoiler exhibiting better appearance was able to obtain. The stiffness of the molded article was also insufficient. Results are given in Table 14.

TABLE 14

| Example | Moldability *) |
|---|---|
| 2-1 | Better |
| 2-2 | Better |
| 2-3 | Better |
| Comp. 2-1 | Draw-down of parison occurred |
| Comp. 2-2 | Parison had rough surface |
| Comp. 2-3 | Draw-down of parison occurred |

Note:
*) Moldability was visually evaluated from the apearance of the molded article <<Vacuum- and Pressure Forming>>

EXAMPLE 3-1

The polypropylene resin composition X-1 obtained in Example 1-1 was processed by adding thereto a predetermined stabilizer, melting the resulting blend at 230° C. and forming it using a sheet-forming machine Model GS-65 (D=65 mm$\phi$, L/D=28; a machine of Ikegai Iron Works, Ltd.) into a sheet of a thickness of 1.5 mm. This sheet was processed by vacuum forming into a vessel of a form of box having a capacity of 3 liters using a vacuum forming machine (a machine of FUSE Vacuum K.K.). No draw-down was recognized during the preheating of the sheet before evacuating the machine and the moldability was better. The resulting vacuum-formed article had a uniform wall thickness distribution together with better appearance. Results are given in Table 15.

EXAMPLE 3-2

In the same manner as in Example 3-1, except that polypropylene resin composition X-6 obtained in Example 1-6 was employed in the place of polypropylene resin composition X-1, a sheet was prepared as in Example 3-1 and this sheet was processed by vacuum forming into a vessel of a form of box having a capacity of 500 milliliters. No draw-down was recognized during the preheating of the sheet before the evacuation and the moldability was better. The resulting vacuum-formed article had a uniform wall thickness distribution with better appearance. Results are given in Table 15.

EXAMPLE 3-3

The polypropylene resin composition X-7 obtained in Example 1-7 was processed by adding thereto a predetermined stabilizer, melting the resulting blend at 230° C. and forming it using a sheet-forming machine of GS-65 Type (D=65 mmφ, L/D=28; a machine of Ikegai Iron Works, Ltd.) into a sheet of a thickness of 1.5 mm. This sheet was processed by vacuum forming into a vessel of a form of box having a capacity of 3 liters using a pressure forming machine (a machine of FUSE Vacuum K.K.). No draw-down was recognized during the preheating of the sheet and the moldability was better. The resulting vacuum-formed article had a uniform wall thickness distribution together with better appearance. Results are given in Table 15.

Comparative Example 3-1

In the same manner as in Example 3-1, except that polypropylene resin composition X-17 obtained in Comparative Example 1-1 was employed in the place of polypropylene resin composition X-1, a vacuum forming of a box-formed vessel of 3 liter capacity was tried. However, a draw-down of the sheet occurred during the preheating of the sheet directly before the evacuation and the moldability was worse. The resulting vacuum-formed article exhibited non-uniform wall thickness distribution and the appearance thereof was also inferior. The results are given in Table 15.

Comparative Example 3-2

In the same manner as in Example 3-2, except that polypropylene resin composition X-23 obtained in Comparative Example 1-7 was employed in the place of polypropylene resin composition X-6, a vaccum forming of a box-formed vessel of 500 milliliter capacity was tried. However, a draw-down of the sheet occurred during the preheating of the sheet directly before the evacuation and the moldability was worse. The resulting vaccum-formed article exhibited non-uniform wall thickness distribution and the appearance thereof was also inferior. The results are given in Table 15.

Comparative Example 3-3

In the same manner as in Example 3-3, except that polypropylene resin composition X-29 obtained in Comparative Example 1-13 was employed in the place of polypropylene resin composition X-7, a pressure forming of a box-formed vessel of 3 liter capacity was tried. However, a draw-down of the sheet occurred during the preheating of the sheet and the moldability was worse. The resulting pressure-formed article exhibited non-uniform wall thickness distribution and the appearance thereof was also inferior. The results are given in Table 15.

TABLE 15

| Example | Moldability *) |
| --- | --- |
| 3-1 | Better |
| 3-2 | Better |
| 3-3 | Better |
| Comp. 3-1 | Draw-down of parison occurred, with non-uniform wall thickness |
| Comp. 3-2 | Draw-down of parison occurred, with non-uniform wall thickness |
| Comp. 3-3 | Draw-down of parison occurred, with non-uniform wall thickness |

Note:
*) Moldability was visually evaluated from the appearance of the molded article <<Foamed Article>>

EXAMPLE 4-1

100 parts by weight of powdered polypropylene resin composition X-6 obtained in Example 1-6, 0.1 part by weight of dicumyl peroxide as the organic peroxide, 1.0 part by weight of divinylbenzene as the cross linking co-agent, 4 parts by weight of azodicarbonamide as the foaming agent, 0.2 parts by weight of an antioxidant and 0.2 parts by weight of a heat stabilizer were blended on a high-speed mixer (Henschel mixer of Mitsui Miike Seisakusho K.K.) to obtain a foamable composition for forming into sheet. This composition was then granulated through an extruder of 65 mmφ into a pelletized product. The resin temperature therefor was 170° C. The so-pelletized product was supplied to a sheet-forming machine GS-65 Type of Ikegai Iron Works, Ltd. (D=65 mmφ, L/D=28, lip opening width 1.0 mm) to process into a foamable polypropylene sheet. The sheet-forming temperature was 170° C. and no foaming was found during the sheet-forming. The resulting sheet had a thickness of 1.0 mm.

The resulting foamable polypropylene sheet was heated by a ceramic heater in the vacuum forming machine for about 90 seconds to blow up into a foamed polypropylene sheet. The temperature of the ceramic heater was settled at 400° C. and the superficial temperature of the formable polypropylene sheet was 210° C. The resulting foamed sheet was cooled by air spray for 60 seconds. The so-obtained foamed polypropylene sheet had a thickness of about 11.9 mm and a density of 0.08 g/cm³ and the foaming magnification ratio was about 11.9-fold. For this foamed polypropylene sheet, the following evaluations were carried out, of which results are given in Table 16.
[Evaluation of Foamed Sheet]
(1) Foaming Magnification Ratio
The foaming magnification ratio was represented by the ratio of the foamed sheet thickness to the original foamable sheet thickness. The thickness was determined using slide calipers.
(2) State of Foaming
The cell structure observed on a cut face of the foamed sheet was visually evaluated based on the following criterion:
⊚ Fine uniform cell structure
○ Uniform cell structure
Δ Non-uniform cell structure with coarse cells
× Inferior foaming.
(3) Cell Size
Cell diameter was determined from microphotograph.

Example 4-2

In the same manner as in Example 4-1, except that polypropylene resin composition X-5 obtained in Example 1-5 was used instead of the polypropylene resin composition X-6, a foamed polypropylene sheet was produced. Evaluation of the resulting sheet was performed in the same manner as in Example 4-1. Results are given in Table 16.

EXAMPLE 4-3

In the same manner as in Example 4-1, except that polypropylene resin composition X-5 obtained in Example 1-5 was used instead of the polypropylene resin composition X-6 and that 15 parts by weight of glass fibers were admixed thereto, a foamed polypropylene sheet was produced. Evaluation of the resulting sheet was performed in the same manner as in Example 4-1. Results are given in Table 16.

EXAMPLE 4-4

100 parts by weight of powdered polypropylene resin composition X-11 obtained in Example 1-11, 0.2 parts by weight of an antioxidant and 0.2 parts by weight of a heat stabilizer were blended on a high-speed mixer (Henschel mixer, supplied from Mitsui Miike Seisakusho K.K.) to obtain a foamable composition for forming into polypropylene sheet. To this composition was then added 0.1 part by weight of sodium bicarbonate served as the foaming nucleating agent and the mixture was kneaded on an extruder of 65 mmφ, while supplying thereto carbon dioxide as the foaming agent at a portion midway the cylinder to produce a foamed polypropylene sheet. The resulting foamed sheet had a thickness of 5.0 mm. By calculating based on the density (0.91 g/cm$^3$) of the original non-foamed sheet, the foaming magnification ratio was 5-fold. The evaluation of this foamed polypropylene sheet was performed in the same manner as in Example 4-1. Results are given in Table 16. By the way, the cell size was found to be in the range of 50–200 μm, of which average value was 100 μm.

EXAMPLE 4-5

100 parts by weight of powdered polypropylene resin composition X-11 obtained in Example 1-11, 0,2 parts by weight of an antioxidant, 0.2 parts by weight of a heat stabilizer and 20 parts by weight of a low density polyethylene product (MIRASON B319, trademark, a product of Mitsui Chemicals, Inc.) were blended on a high-speed mixer (Henschel mixer supplied from Mitsui Miike Seisakusho K.K.) to obtain a foamable composition for forming into a propylene sheet. Using this composition, a foamed polypropylene sheet was obtained in the same manner as in Example 4-4. The evaluation of the so-obtained foamed polypropylene sheet was performed in the same manner as in Example 4-1. Results are given in Table 16.

Comparative Example 4-1

In the same manner as in Example 4-1, except that the polypropylene X-17 obtained in Comparative Example 1-1 was used instead of the polypropylene resin composition X-6, a foamed polypropylene sheet was produced. For the resulting polypropylene foamed sheet, evaluations were carried out in the same manner as in Example 4-1. Results are given in Table 16.

Comparative Example 4-2

In the same manner as in Example 4-1, except that the polypropylene resin composition X-19 obtained in Comparative Example 1-3 was used instead of the polypropylene resin composition X-6, a foamed polypropylene sheet was produced. For the resulting polypropylene foamed sheet, evaluations were carried out in the same manner as in Example 4-1. Results are given in Table 16.

Comparative Example 4-3

In the same manner as in Example 4-1, except that the polypropylene resin composition X-19 obtained in Comparative Example 1-3 was used instead of the polypropylene resin composition X-6 and that 15 parts by weight of GF (glass fiber) were further admixed thereto, production of foamed polypropylene sheet was tried. However, by escape of the gas generated from the foaming agent due to collapse of foam cells by the glass fibers, any foamed sheet was not able to obtain.

Comparative Example 4-4

In the same manner as in Example 4-4, except that the polypropylene resin composition X-17 obtained in Comparative Example 1-1 was used instead of the polypropylene resin composition X-11, a foamed polypropylene sheet was produced. For the resulting polypropylene foamed sheet, evaluations were carried out in the same manner as in Example 4-1. Results are given in Table 16.

Comparative Example 4-5

100 parts by weight of powdered polypropylene resin composition X-17 obtained in Comparative Example 1-1, 0.2 parts by weight of an antioxidant, 0.2 parts by weight of a heat stabilizer and 20 parts by weight of a low density polyethylene (MIRASON B319, trademark, a product of Mitsui Chemicals, Inc.) were kneaded on a high-speed Henschel mixer (supplied from Mitsui Miike Seisakusho K.K.) to obtain a composition for forming a foamable polypropylene sheet. This composition was caused to blow up into a foamed polypropylene sheet in the same manner as in Example 4-4. For the resulting foamed polypropylene sheet, evaluations were carried out in the same manner as in Example 4-1. Results are given in Table 16.

TABLE 16

Properties of Foamed Sheet

| Example No. | Glass fiber cont. (wt. %) | Sheet cell structure | Cell size (μm) | Foaming magnif. rate (times) | Density g/cm$^3$ |
|---|---|---|---|---|---|
| Ex. 4-1 | 0 | ⊚ | 300~700 | 11.9 | 0.08 |
| Comp. 4-1 | 0 | Δ | 1000~1500 | 3.1 | 0.29 |
| Ex. 4-2 | 0 | ⊚ | 300~700 | 10.5 | 0.09 |
| Comp. 4-2 | 0 | Δ | 1000~1500 | 2.8 | 0.29 |
| Ex. 4-3 | 15 | ○ | 300~700 | 10.1 | 0.13 |
| Comp. 4-3 | 15 | x | not formable | — | 0.92 |
| Ex. 4-4 | 0 | ⊚ | 50~200 | 5.0 | 0.18 |
| Comp. 4-4 | 0 | Δ | 100~500 | 1.6 | 0.58 |
| Ex. 4-5 | 0 | ⊚ | 50~200 | 6.3 | 0.16 |
| Comp. 4-5 | 0 | Δ | 100~500 | 1.9 | 0.50 |

<<Calendered Article>>

EXAMPLE 5-1

The polypropylene resin composition X-12 obtained in Example 1-12 was processed, after addition thereto a predetermined stabilizer, by calendering using a calendering machine (a reverse L-formed machine supplied from Nippon Roll K.K.) at a resin temperature of 220° C., a first roller temperature of 175° C., a second roller temperature of 175° C., a third roller temperature of 175° C., a fourth roller temperature of 175° C. and a cooling roller temperature of 80° C., at a rolling-up speed of 40 m/sec to form a sheet having a thickness of 2 mm. No draw-down was observed during the processing and the moldability was better. Results are given in Table 17.

EXAMPLE 5-2

The polypropylene resin composition X-3 obtained in Example 1-3 was processed, after addition thereto a predetermined stabilizer, by calendering using a calendering machine (a reverse L-formed machine supplied from Nippon Roll K.K.) at a resin temperature of 230° C., a first roller temperature of 180° C., a second roller temperature of 180° C., a third roller temperature of 180° C., a fourth roller temperature of 180° C. and a cooling roller temperature of 80° C., at a rolling-up speed of 40 m/sec to form a sheet having a thickness of 2 mm. No draw-down was observed during the processing and the moldability was better. Results are given in Table 17.

EXAMPLE 5-3

The polypropylene resin composition X-7 obtained in Example 1-7 was processed, after addition thereto a predetermined stabilizer, by calendering using a calendering machine (a reverse L-formed machine supplied from Nippon Roll K.K.) at a resin temperature of 240° C., a first roller temperature of 190° C., a second roller temperature of 190° C., a third roller temperature of 190° C., a fourth roller temperature of 190° C. and a cooling roller temperature of 80° C., at a rolling-up speed of 40 m/sec to form a sheet having a thickness of 2 mm. No draw-down was observed during the processing and the moldability was better. Results are given in Table 17.

Comparative Example 5-1

In the same manner as in Example 5-1 except that the polypropylene resin composition X-19 obtained in Comparative Example 1-3 was used instead of the polypropylene resin composition X-12, calendering of sheet was tried. However, a draw-down occurred during the calendering and production of sheet failed. Results are given in Table 17.

Comparative Example 5-2

In the same manner as in Example 5-2 except that the polypropylene resin composition X-23 obtained in Comparative Example 1-7 was used instead of the polypropylene resin composition X-3, calendering of sheet was tried. However, a draw-down occurred during the calendering and production of sheet failed. Results are given in Table 17.

Comparative Example 5-3

In the same manner as in Example 5-3 except that the polypropylene resin composition X-26 obtained in Comparative Example 1-10 was used instead of the polypropylene resin composition X-7, calendering of sheet was tried. However, a draw-down occurred during the calendering and production of sheet failed. Results are given in Table 17.

TABLE 17

| Example | Moldability *) |
|---|---|
| 5-1 | Better |
| 5-2 | Better |
| 5-3 | Better |

TABLE 17-continued

| Example | Moldability *) |
|---|---|
| Comp. 5-1 | Draw-down occurred |
| Comp. 5-2 | Draw-down occurred |
| Comp. 5-3 | Draw-down occurred with gel-formation |

Note:
*) Moldability was visually evaluated from the appearance of the sheet.

<<Extrusion-molded Articles>>

EXAMPLE 6-1

The polypropylene resin composition X-4 obtained in Example 1-4 was processed, after addition thereto a predetermined stabilizer, by extrusion-molding using a pipe molding machine of Model FS-65 of Ikegai Iron Works, Ltd. (D=65 mm$\phi$, L/D=25) at a resin temperature of 220° C. into a pipe having a diameter of 90 cm with a wall thickness of 1.5 mm. No draw-down occurred during the molding and the moldability was better. Results are given in Table 18.

EXAMPLE 6-2

The polypropylene resin composition X-15 obtained in Example 1-15 was processed, after addition thereto a predetermined stabilizer, by extrusion-molding using a sheet extruding machine of Model FS-65 of Ikegai Iron Works, Ltd. (D=65 mm$\phi$, L/D=25) at a resin temperature of 220° C. into a sheet of a thickness of 2 mm. No draw-down occurred during the molding and the moldability was better. Results are given in Table 18.

EXAMPLE 6-3

In the same manner as in Example 6-1 except that the polypropylene resin composition X-10 obtained in Example 1-10 was used instead of the polypropylene resin composition X-4, extrusion molding of pipe was carried out. No draw-down occurred during the molding and the moldability was better. Results are given in Table 18.

Comparative Example 6-1

In the same manner as in Example 6-1 except that the polypropylene resin composition X-17 obtained in Comparative Example 1-1 was used instead of the polypropylene resin composition X-4, extrusion molding of pipe was carried out. However, a draw-down occurred during the molding and production of pipe failed. Results are given in Table 18.

Comparative Example 6-2

In the same manner as in Example 6-2 except that the polypropylene resin composition X-23 obtained in Comparative Example 1-7 was used instead of the polypropylene resin composition X-15, extrusion molding of sheet was carried out. However, a draw-down occurred during the molding and production of sheet failed. Results are given in Table 18.

Comparative Example 6-3

In the same manner as in Example 6-1 except that the polypropylene resin composition X-28 obtained in Comparative Example 1-12 was used instead of the polypropylene resin composition X-4, extrusion molding of pipe was carried out. However, due to insufficient plasticizing of the higher molecular weight polymers and the lower molecular weight polymers owing to the wide molecular weight distribution of the polypropylene resin composition X-17, the appearance of the resulting molded product was worse and, in addition, the stiffness thereof was inferior due to lower isotactic pentad fraction. Results are given in Table 18.

TABLE 18

| Results of Extrusion Molding | |
| --- | --- |
| Example | Moldability *) |
| 6-1 | Better |
| 6-2 | Better |
| 6-3 | Better |
| Comp. 6-1 | Draw-down of pipe occurred |
| Comp. 6-2 | Draw-down of sheet occurred |
| Comp. 6-3 | Rough surface occurred with insufficient stiffness |

Note:
*) Moldability was visually evaluated from the appearance of the sheet.

<<Stretched Film>>

EXAMPLE 7-1

The polypropylene resin composition X-13 obtained in Example 1-13 was blended with a predetermined stabilizer on a Henschel mixer and the resulting blend was processed by a 65 mm$\phi$ monoaxial extruder (a machine supplied from Ishinaka Tekkosho K.K.) into a pelletized product. The pelletized product was processed by extruding from a sheet-forming machine having an aperture diameter of 90 mm at a resin temperature of 280° C. and passing through a cooling roller at 30° C. into a sheet of 1.5 mm thickness. The so-obtained sheet was subjected to a stretching on a tenter-type successive biaxial stretching machine at 145° C. at a stretching ratio in the longitudinal direction of 5-fold and then 10-fold in the lateral direction in a tenter of a vessel temperature of 170° C. to obtain a biaxially stretched film having a thickness of about 30 $\mu$m. Here, the film processing speed was able to increase up to 45 m/min. The thickness accuracy of the so-obtained film was visually evaluated. Results are given in Table 19.

Example 7-2

In the same manner as in Example 7-1 except that the polypropylene resin composition X-9 obtained in Example 1-9 was used instead of the polypropylene resin composition X-13, a biaxially stretched film of a thickness of 30 $\mu$m was obtained. Results are given in Table 19.

Comparative Example 7-1

In the same manner as in Example 7-1 except that the polypropylene resin composition X-19 obtained in Comparative Example 1-3 was used instead of the polypropylene resin composition X-13, production of a biaxially stretched film of 30 $\mu$m thickness was tried. However, due to the lower thickness accuracy of the original roll sheet causing thinner area in the center of film, breaking of film occurred during the stretching and stable production of film was not able. Results are given in Table 19.

Comparative Example 7-2

In the same manner as in Example 7-1 except that the polypropylene resin composition X-27 obtained in Comparative Example 1-11 was used instead of the polypropylene resin composition X-13, a biaxially stretched film of 30 $\mu$m thickness was produced. However, considerable gel-formation occurred, whereby the appearance of the film as a biaxially stretched film was debased greatly. Results are given in Table 19.

TABLE 19

| Results of Stretching of Film | | |
| --- | --- | --- |
| Example | Maximum film speed | Thickness accuracy *) |
| 7-1 | 45 m/min. | ⊚ |
| 7-2 | 40 m/min. | ⊚ |
| Comp. 7-1 | not strechable | x |
| Comp. 7-2 | 40 m/min. | Considerable gel-formation |

Note:
*) visually evaluated by the criterion:
⊚: Better thickness accuracy with uniform film thickness
○: Somewhat debased thickness accuracy with occurrence of thickness irregularity on a part of the film
Δ: Inferior thickness accuracy with thinning in central portion of the film, yet permitting stretching
x: Bad thickness accuracy with thinning in central portion of film, with occurrence of film breaking <<Inflation Film>>

EXAMPLE 8-1

The polypropylene resin composition X-8 obtained in Example 1-8 was blended with a predetermined stabilizer and the resulting blend was processed by a 65 mm$\phi$ single screw extruder into a pelletized product. The pelletized product was processed by an inflation molding using a commercially available tubular film producing machine for polyolefin into a film having a width of 180 mm and a thickness of 0.03 mm. The molding was effected at a resin temperature of 230° C. and at a screw revolution rate of 60 r.p.m. with a die of 60 mm$\phi$ diameter and 0.3 mm slit width and with a single stage air cooling (air temperature of 10° C.). The resulting inflation film was tested for its Young's modulus according to ASTM D-882 and for its haze in accordance with ASTM D-1003. Results are given in Table 20.

EXAMPLE 8-2

In the same manner as in Example 8-1 except that the polypropylene resin composition X-12 obtained in Example 1-12 was used instead of the polypropylene resin composition X-8, an inflation molding of film was performed. Results are given in Table 20.

Comparative Example 8-1

In the same manner as in Example 8-1 except that the polypropylene resin composition X-19 obtained in Comparative Example 1-3 was used instead of the polypropylene resin composition X-8, an inflation molding of film was performed. Results are given in Table 20.

Comparative Example 8-2

In the same manner as in Example 8-1 except that the polypropylene resin composition X-22 obtained in Comparative Example 1-6 was used instead of the polypropylene resin composition X-8, an inflation molding of film was performed. Results are given in Table 20.

Comparative Example 8-3

In the same manner as in Example 8-1 except that the polypropylene resin composition X-20 obtained in Comparative Example 1-4 was used instead of the polypropylene resin composition X-8, an inflation molding of film was performed. Results are given in Table 20.

Comparative Example 8-4

In the same manner as in Example 8-1 except that the polypropylene resin composition X-21 obtained in Comparative Example 1-5 was used instead of the polypropylene resin composition X-8, an inflation molding of film was performed. Results are given in Table 20.

TABLE 20

Results of Film Inflation Molding

| Example | Haze (%) | Young's modulus (kgf/cm²) | Stability of baloon * |
|---|---|---|---|
| 8-1 | 9.2 | 154 | ○ |
| 8-2 | 8.6 | 148 | ○ |
| Comp. 8-1 | 10.3 | 108 | x |
| Comp. 8-2 | 9.8 | 119 | Δ |
| Comp. 8-3 | 10.5 | 142 | x |
| Comp. 8-4 | 10.1 | 135 | x |

Note:
*) By the following evaluation criterion:
○: Stable baloon with uniform film thickness
Δ: Unstable baloon with irregular film thickness
x: Unstable baloon with impermission of continuous molding

EXAMPLE 9-1

Using the polypropylene resin composition X-2 obtained in Example 1-2, a parison was extrusion-molded at a resin temperature of 210° C. This parison was worked once by a pre-blowing by blowing air into the inside space of the parison and was then set in a split mold to process it by blow molding under the condition given below by blowing air thereto. No draw-down of the parison occurred and the moldability was better. The appearance of the molded article was better and no rough surface nor waving was observed.

| | |
|---|---|
| Mirror reflection degree of mold cavity face | #1500 |
| Air vents | 0.3 mm φ, at 50 mm pitch |
| Resin temperature on blow molding | 210° C. |
| Pressure of blown air | 490 kPa |

EXAMPLE 9-2

In the same manner as in Example 9-1 except that the polypropylene resin composition X-10 obtained in Example 1-10 was used instead of the polypropylene resin composition X-2, a blow molding was performed. Results are given in Table 24.

Comparative Examples 9-1 to 9-4

In the same manner as in Example 1-2 except that the polymerization condition was changed to those given in Table 21 below, polypropylene resin compositions were produced. Then, using each of these resin compositions in the place of the polypropylene resin composition X-2, blow molding was performed in the same manner as in Example 9-1. Results are given in Tables 22–24.

TABLE 21

| | In 1st stage polymer. | | | In 2nd stage polymer. | | |
|---|---|---|---|---|---|---|
| Comp. Example | Temp. (° C.) | Durat. (min.) | H₂-part. press. (kPa) | Temp. (° C.) | Durat. (min.) | H₂-part. press. (kPa) |
| 9-1 | 70 | 60 | 9.8 | — | — | — |
| 9-2 | 70 | 60 | 7.8 | — | — | — |
| 9-3 | 60 | 35 | — | 70 | 35 | 78 |
| 9-4 | 60 | 35 | — | 70 | 20 | 69 |

TABLE 22

| Comp. Example | MFR [1] (g/10 min) | (mmmm) (%) [2] | [η] of high mol. wt. component (dl/g) [3] | Content of high mol. wt. component (wt. %) |
|---|---|---|---|---|
| 9-1 | 0.5 | 97.5 | — | 0 |
| 9-2 | 0.2 | 98.2 | — | 0 |
| 9-3 | 0.5 | 98.2 | 10 | 40 |
| 9-4 | 0.3 | 98.2 | 9.5 | 48 |

Notes:
[1] MFR was determined according to ASTM D1238.
[2] Isotactic pentad fraction, determined by ¹³C-NMR.
[3] Intrinsic viscosity [η], determined in decalin at 135° C.

TABLE 23

| Comp. Example | Mw/Mn [1] | Mz/Mw [2] | Melt tension (g) [3] | Critical shearing rate [4] (sec⁻¹) | Calculation by formula (I) [5] |
|---|---|---|---|---|---|
| 9-1 | 4.9 | 3.2 | 5.6 | 1.824 × 10² | 7.342 |
| 9-2 | 4.2 | 2.6 | 10.4 | 6.080 × 10¹ | 11.91 |
| 9-3 | 32.4 | 4.4 | 12.5 | 6.080 × 10⁰ | 21.49 |
| 9-4 | 7.5 | 4.1 | 11.4 | 6.080 × 10¹ | 11.91 |

Notes:
[1] Determined by GPC.
[2] Determined by GPC.
[3] Determined under the following conditions:
Apparatus : CAPIROGRAPH 1C (trademark) of Toyo Seiki Seisaku-Sha, Ltd.
Temperature : 230° C.
Orifice : L = 8.00, D = 2.095 mm
Extrusion speed : 15 mm/min.
Rolling-up speed : 10 m/min.
4) The shearing speed at which melt fracture is brought about is determined under the following conditions:
Apparatus : CAPIROGRAPH 1C (trademark) of Toyo Seiki Seisaku-Sha, Ltd.
Temperature : 230° C.
Orifice : L = 10.9, D = 1.00 mm
5) Values calculated from the numerical formula (I) given previously.

TABLE 24

| Example | Frexural modulus (MPa) [1] | Moldability (appearance) [2] |
|---|---|---|
| 9-1 | 1716 | Better |
| 9-2 | 1700 | Better |
| Comp. 9-1 | 1422 | Draw-down of parison |
| Comp. 9-2 | 1568 | Rough surface on parison |
| Comp. 9-3 | 1720 | Rough surface on parison |
| Comp. 9-4 | 1754 | Rough surface on parison |

TABLE 24-continued

| Example | Frexural modulus (MPa) [1] | Moldability (appearance) [2] |
|---|---|---|

Notes:
[1] Determined according to ASTM D790.
[2] "Better" means that the parison is superior in the appearance with no draw-down nor surface roughness nor waving.

As seen from Table 24, the polypropylene resin compositions of Examples 9-1 and 9-2 which have the characteristic features of 1), 2), 4), 5), 7) and 8) defined in claim 8 are superior in the stiffness (frexural modulus) and moldability.

In contrast, the polypropylene resin of Comparative Example 9-1 which has a single-modal molecular weight and low isotactic pentad fraction has a low stiffness and brings about molded articles of inferior appearance. The polypropylene resin of Comparative Example 9-2 which has a single-modal molecular weight and a higher isotactic pentad fraction has a low stiffness and brings about molded articles of somewhat inferior appearance, though it exhibits an improved melt tension. The polypropylene resin composition of Comparative Example 9-3 which has a bi-modal molecular weight distribution and is wider in the Nw/Mn-value brings about molded articles of inferior appearance, though it has an improved melt tension and increased stiffness. The polypropylene resin composition of Comparative Example 9-4 which possesses the characteristic features 1), 2), 4), 5), 7) and 8) defined in claim 8 but does not meet the condition of formula (I) brings about molded articles of somewhat inferior appearance, though it has an improved melt tension and increased stiffness.

INDUSTRIAL APPLICABILITY

As described above, the first and the second polypropylene resin compositions according to the present invention have a high melt tension and are superior in the moldability and stiffness and can bring about molded articles, which are superior in the appearance and are difficultly deformable, at a high through-put rate in an efficient manner, even in the case of large-sized articles. Therefore, the polypropylene resin composition according to the present invention will find wide applications in application fields requiring the above identified characteristic features without limitation. It can be used as the starting materials for, such as blow-molded articles, vacuum- or pressure-formed articles, calendered articles, extrusion-molded articles, stretched films, inflation films and foamed articles, favoritely. By the process for producing the polypropylene resin composition according to the present invention, the above-mentioned polypropylene resin composition according to the present invention can easily and efficiently be produced at a low cost.

The resin composition for blow molding according to the present invention has a high melt tension and is superior in the moldability and in the stiffness due to the content of the polypropylene resin composition according to the present invention, and therefore, can be used favorably as the starting material for blow molding large-sized and difficultly deformable articles in high-speed molding.

The blow-molded articles according to the present invention can encompass wide variety of articles, including, due to the superior appearance and higher stiffness, larger automobile exterior parts, such as bumper and spoiler, and large-sized bolts etc.

The vacuum- and pressure-formed articles, calendered articles, extrusion molded articles, stretched films and inflation films according to the present invention are superior, due to the use of the polypropylene resin composition according to the present invention as their material, in the appearance and in the stiffness, so that they can include articles necessitating the above-mentioned characteristic features.

The foamed articles according to the present invention exhibit a high foaming magnification ratio and have uniform foam cell structure of fine cells, so that their use, in particular, for large-sized articles will favor the user.

What is claimed is:

1. A polypropylene resin composition comprising polypropylene as a main component, said polypropylene resin composition having the characteristic features:
   1) a melt flow rate (MFR), determined at 230° C. under a load of 2.16 kg, in the range of 0.01–5 g/10 min,
   2) a content of a high molecular weight polypropylene exhibiting an intrinsic viscosity ($\eta$), determined at 135° C. in decalin, of 8–13 dl/g in the range of 15–50% by weight,
   3) a gel areal density in number of 3,000/450 cm$^2$ or less, and
   4) a molecular weight distribution, determined by gel permeation chromatography (GPC), in the range of 6–20 for Mw/Mn and 3.5 or higher for Mz/Mw.

2. The polypropylene resin composition according to claim 1, wherein said polypropylene resin composition has the further characteristic feature:
   5) an isotactic pentad fraction (mmmm fraction), determined by $^{13}$C-NMR, of at least 97%.

3. The polypropylene resin composition according to claim 1, wherein said polypropylene resin composition has the further characteristic feature:
   6) when dividing an area underlying a molecular weight distribution curve on a molecular weight distribution diagram, obtained by gel permeation chromatography, at the maximum peak molecular weight into two parts, a ratio of the surface area, $S_H$, for the higher molecular weight side part to the surface area, $S_L$, for the lower molecular weight side part, $S_H/S_L$, is at least 1.3; and a proportion of the area for the high molecular weight part having a molecular weight of at least 1.5×10$^6$ relative to the surface area underlying the entire molecular weight distribution curve is at least 7%.

4. The polypropylene resin composition according to claim 2, wherein said polypropylene resin composition has the further characteristic feature:
   6) when dividing an area underlying a molecular weight distribution curve on a molecular weight distribution diagram, obtained by gel permeation chromatography, at the maximum peak molecular weight into two parts, a ratio of the surface area, $S_H$, for the higher molecular weight side part to the surface area, $S_L$, for the lower molecular weight side part, $S_H/S_L$, is at least 1.3; and a proportion of the area for the high molecular weight part having a molecular weight of at least 1.5×10$^6$ relative to the surface area underlying the entire molecular weight distribution curve is at least 7%.

5. The polypropylene resin composition according to claim 1, wherein said polypropylene resin composition has the further characteristic feature:
   7) a melt tension (MT), determined by flow tester at 230° C., is in the range of 5–30 g.

6. The polypropylene resin composition according to claim 2, wherein said polypropylene resin composition has the further characteristic feature:

7) a melt tension (MT), determined by flow tester at 230° C., is in the range of 5–30 g.

7. The polypropylene resin composition according to claim 3, wherein said polypropylene resin composition has the further characteristic feature:

7) a melt tension (MT), determined by flow tester at 230° C., is in the range of 5–30 g.

8. The polypropylene resin composition according to claim 4, wherein said polypropylene resin composition has the further characteristic feature:

7) a melt tension (MT), determined by flow tester at 230° C., is in the range of 5–30 g.

9. A process for producing a polypropylene resin composition as claimed in claim 1, by polymerizing propylene in a multistage polymerization of at least two stages in the presence of a polymerization catalyst formed from (a) a solid catalyst component based on titanium containing magnesium, titanium, a halogen and an election donor, (b) a catalyst component based on an organometallic compound and (c) a catalyst component based on an organosilicon compound having at least one group selected from the group consisting of cyclopentyl, cyclopentenyl, cyclopentadienyl and derivatives thereof;

the said process comprising:

forming, in a first polymerization stage, a high molecular weight polypropylene product having an intrinsic viscosity ($\eta$), determined at 135° C., in decalin, of 8–13 dl/g, up to a proportion of 15–50% by weight with respect to the total amount of the finally obtained polypropylene resin composition, by polymerizing propylene in the substantial absence of hydrogen; and then, in each of a second and any succeeding polymerization stages, polymerizing propylene in such a manner that a polypropylene product having an intrinsic viscosity ($\eta$), determined at 135° C. in decalin, lower than 8 dl/g is produced and that the melt flow rate (MFR), determined at 230° C. under a load of 2.16 kg, of the finally obtained polypropylene resin composition will, as a whole, be in the range of 0.01–5 g/10 min.

10. The process as claimed in claim 9, wherein the polymerization of propylene in each polymerization stage is effected continuously.

11. The process as claimed in claim 9, wherein the polymerization of propylene in said second and any succeeding polymerization stages is effected using at least two polymerization reactors.

12. A blow-molded article produced by subjecting the resin composition defined in claim 1 to the blow molding.

13. A vacuum-formed or pressure-formed article produced by subjecting the polypropylene resin composition defined in claim 1 to a vacuum or pressure forming.

14. A calendared article produced by subjecting the polypropylene resin composition defined in claim 1 to a calendaring.

15. A foamed article produced by subjecting the polypropylene resin composition defined in claim 1 to foaming.

16. An extrusion-molded article produced by subjecting the polypropylene resin composition defined in claim 1 to an extrusion molding.

17. A stretched film produced by subjecting a sheet or film of the polypropylene resin composition defined in claim 1 to a stretching.

18. An inflation film produced by subjecting the polypropylene resin composition defined in claim 1 to an inflation molding.

* * * * *